(12) United States Patent
Liang et al.

(10) Patent No.: US 12,556,250 B2
(45) Date of Patent: Feb. 17, 2026

(54) CHANNEL SOUNDING METHOD AND APPARATUS

(71) Applicant: Huawei Technologies Co., Ltd., Guangdong (CN)

(72) Inventors: Dandan Liang, Shenzhen (CN); Ming Gan, Shenzhen (CN); Jian Yu, Shenzhen (CN); Guogang Huang, Shenzhen (CN); Yuchen Guo, Shenzhen (CN); Peter Loc, Cupertino, CA (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 24 days.

(21) Appl. No.: 17/576,077

(22) Filed: Jan. 14, 2022

(65) Prior Publication Data

US 2022/0140879 A1  May 5, 2022

Related U.S. Application Data

(63) Continuation of application No. PCT/CN2020/102333, filed on Jul. 16, 2020.

(30) Foreign Application Priority Data

Jul. 16, 2019 (CN) .......................... 201910640313.6

(51) Int. Cl.
*H04B 7/06* (2006.01)
*H04B 7/024* (2017.01)
(Continued)

(52) U.S. Cl.
CPC ........... *H04B 7/0626* (2013.01); *H04B 7/024* (2013.01); *H04B 7/0417* (2013.01); *H04W 24/10* (2013.01)

(58) Field of Classification Search
CPC .... H04B 7/0626; H04B 7/024; H04B 7/0643; H04W 24/10; H04W 84/12
See application file for complete search history.

(56) References Cited

U.S. PATENT DOCUMENTS

| | | | |
|---|---|---|---|
| 2012/0172083 A1 | 7/2012 | Logalbo et al. | |
| 2012/0250543 A1* | 10/2012 | Abraham | H04L 1/0028 370/252 |

(Continued)

FOREIGN PATENT DOCUMENTS

| | | |
|---|---|---|
| CN | 106160939 A | 11/2016 |
| CN | 106788622 A | 5/2017 |

(Continued)

OTHER PUBLICATIONS

Yusuke Tanaka(Sony Corporation), et al., IEEE 802.11-19/0104r0, "Discussion on Multi-AP Coordination Type", SONY, 2019-1-14 (Year: 2019).*

(Continued)

*Primary Examiner* — Aristocratis Fotakis
(74) *Attorney, Agent, or Firm* — WOMBLE BOND DICKINSON (US) LLP

(57) ABSTRACT

Embodiments of this application provide a channel sounding method and apparatus, and relate to the communication field. The method includes: A station STA receives channel sounding frames sent by a plurality of access points APs; the STA performs channel sounding based on the channel sounding frames to obtain channel state information of each AP; and the STA sends a channel measurement report frame, where the channel measurement report frame includes channel state information of some of the plurality of APs and identifiers of the some APs, and the channel measurement report frame is further used to indicate that the some APs are selected to participate in coordinated transmission. That the channel measurement report frame is used to indicate that an (Continued)

| Frame control | Duration | RA | TA | Retransmission AP information | Retransmission mode | Transmitting address indication | FCS |
|---|---|---|---|---|---|---|---|

AP is selected to participate in coordinated transmission can not only feedback channel state information but also reduce signaling overheads.

16 Claims, 20 Drawing Sheets

(51) Int. Cl.
*H04B 7/0417* (2017.01)
*H04W 24/10* (2009.01)

(56) References Cited

U.S. PATENT DOCUMENTS

| | | | |
|---|---|---|---|
| 2014/0226612 A1* | 8/2014 | Kim | H04W 24/10 370/328 |
| 2016/0365952 A1* | 12/2016 | Kim | H04L 1/1816 |
| 2018/0159609 A1* | 6/2018 | Yu | H04B 7/0626 |
| 2018/0317128 A1* | 11/2018 | Chun | H04L 5/0055 |
| 2019/0297552 A1* | 9/2019 | Joseph | H04L 1/0009 |
| 2020/0037275 A1* | 1/2020 | Liu | H04L 5/0048 |
| 2020/0100224 A1* | 3/2020 | Khoshnevisan | H04L 5/0007 |
| 2021/0006361 A1* | 1/2021 | Asterjadhi | H04L 1/1819 |
| 2021/0111839 A1* | 4/2021 | Bhamri | H04L 5/0055 |
| 2021/0391967 A1* | 12/2021 | Gao | H04L 5/0035 |
| 2022/0209825 A1* | 6/2022 | Chitrakar | H04W 76/15 |

FOREIGN PATENT DOCUMENTS

| | | |
|---|---|---|
| CN | 109547072 A | 3/2019 |
| CN | 109756256 A | 5/2019 |

OTHER PUBLICATIONS

R1-1907424, Views on CSI framework for multi-TRP, Ericsson, 3GPP TSG RAN WG1 Meeting #97, Reno, USA, May 13-17, 2019 (Year: 2019).*
Sungjin Park et al., Multi-AP Transmission Procedure, IEEE 802.11-19/0448r1, Mar. 2019, 18 pages.
IEEE Std 802.11 -2016, IEEE Standard for Information technology—Telecommunications and information exchange between systems Local and metropolitan area networks-Specific requirements, Part 11: Wireless LAN Medium Access Control (MAC) and Physical Layer (PHY) Specifications, Approved Dec. 7, 2016, total 3534 pages.
"Series H: Audiovisual and Multimedia Systems, Infrastructure of Audiovisual Services Coding of Moving Video, Advance Video Coding for Generic Audiovisual Services," ITU-T, Telecommunication Standardization Sector of TUH.264, Mar. 2010, 676 pages.
P. Deutsch, DEFLATE Compressed Data Format Specification version 1.3. RFC1951, May 1996, 15 pages.
P. Deutsch, GZIP file format specification version 4.3, May 1996, RFC 1952, 12 pages.

* cited by examiner

| |
|---|
| Reserved (Reserved) |
| Sounding dialog token number (Sounding dialog token number) |
| Resource unit end index (RU End Index) |
| Resource unit start index (RU Start Index) |
| First feedback segment (First feedback segment) |
| Remaining feedback segment (Remaining feedback segment) |
| Feedback type (feedback type) |
| Codebook information (codebook information) |
| Grouping (Grouping, Ng) |
| Channel bandwidth (BW) |
| Row number index (Nr index) |
| Column number index (Nc index) |

FIG. 2

| Receiving address | Transmitting address | Feedback type | Reserved |
|---|---|---|---|

FIG. 9

| Category | Action indication | MIMO control | Beamforming report |
|---|---|---|---|

FIG. 10

| Frame control | Duration | RA | TA | Retransmission AP information | Retransmission mode | Transmitting address indication | FCS |

FIG. 20

CHANNEL SOUNDING METHOD AND APPARATUS

CROSS-REFERENCE TO RELATED APPLICATIONS

This application is a continuation of International Application No. PCT/CN2020/102333, filed on Jul. 16, 2020, which claims priority to Chinese Patent Application No. 201910640313.6, filed on Jul. 16, 2019. The disclosures of the aforementioned applications are hereby incorporated by reference in their entireties.

TECHNICAL FIELD

Embodiments of this application relate to the communication field, and in particular, to a channel sounding method and apparatus.

BACKGROUND

With development of a wireless network and gradual popularization of a wireless local area network (WLAN) technology, WLAN devices are deployed more densely. Because wireless access points (APs) are easy to deploy, the APs are more frequently used. However, as the APs are deployed more densely, inter-cell interference is caused. How to reduce the inter-cell interference and improve quality of service for a user through collaboration between the APs becomes an urgent problem to be resolved.

A basis of the collaboration between the APs is establishment of a collaboration relationship based on channel state information. In the conventional technology, for channel sounding of an AP, refer to a channel sounding process in 802.11ac, as shown in FIG. 1. To be specific, the AP first sends a null data packet announcement (NDPA) frame to announce a station (STA) that needs to perform channel sounding and related channel sounding parameters, and then broadcasts an NDP frame after short interframe space (SIFS), where the NDP frame does not carry any data field part. The STA may perform channel estimation on the AP based on the received NDP, and generate a beamforming report (BFR). Subsequently, the AP sends a beamforming report poll (BFRP) to the STA, to request, from one or more STAs, channel state information that has not been fed back or that is incorrectly fed back.

In 802.11ax, a multi-user uplink transmission mechanism is introduced, and the AP may indicate a plurality of STAs to simultaneously upload beamforming reports, to further improve channel sounding efficiency. In the conventional technology, a beamforming report includes a multiple-input multiple-output (MIMO) control field and a beamforming report field. The MIMO control field may include but is not limited to the following control information: bandwidth, a transmit antenna quantity, and a receive antenna quantity. For example, a structure of the MIMO control field may be shown in FIG. 2.

However, in both 802.11ac and 802.11ax, channel sounding solutions are intended for a single AP and a plurality of STAs. For a multi-AP channel sounding manner, an existing technical solution is that a primary AP and secondary APs send NDP frames, so that a STA performs channel sounding based on the NDP frames to obtain channel state information. Then, the primary AP needs to obtain channel state information of all the APs, and select a collaborating AP based on the channel state information. It is clear that selecting the collaborating AP based on the channel state information of all the APs causes relatively large overheads on feedback of the channel state information, thereby resulting in relatively low efficiency.

SUMMARY

This application provides a channel sounding method and apparatus, to implement a collaborating AP selection manner that reduces overheads on feedback of channel state information.

The following technical solutions are used in this application.

According to a first aspect, an embodiment of this application provides a channel sounding method. The method may include: A STA receives channel sounding frames sent by n APs, where n is an integer greater than 1. Next, the STA performs channel sounding on channels of the n APs based on the received channel sounding frames to obtain channel state information of each AP. Then, the STA sends a channel measurement report frame, where the channel measurement report frame includes channel state information of m target APs in the n APs and identifiers of the m target APs, and the channel measurement report frame may be further used to indicate that the m target APs are selected to participate in coordinated transmission, where m is an integer greater than 1 and less than or equal to n.

In this way, the STA may select a collaborating AP based on the channel state information. In addition, the STA may feed back the channel state information to notify an AP whether the AP is selected to participate in coordinated transmission. Correspondingly, the AP may also determine, depending on whether the channel state information is obtained, whether the AP is selected to participate in coordinated transmission. In addition, an AP that does not obtain the channel state information may determine that a state of a channel between the AP and the STA is relatively poor. Therefore, an AP selection manner that reduces overheads on feedback of channel sounding is provided.

In an embodiment, the method may further include: The STA sends indication information, where the indication information may be used to indicate that (n−m) non-target APs are not selected to participate in coordinated transmission.

In this way, the STA may notify, by feeding back the indication information, the non-target APs that the non-target APs are not selected to participate in coordinated transmission.

In an embodiment, the indication information may include channel quality information of the (n−m) non-target APs and identifiers of the (n−m) non-target APs; or the indication information may include non-selection indication information and identifiers of the (n−m) non-target APs, where the non-selection indication information is used to indicate that the (n−m) non-target APs are not selected, and the channel quality information is used to indicate channel quality of channels between the non-target APs and the STA.

In this way, the STA may feed back the channel quality information to the non-target APs or feed back the non-selection indication information to the non-target APs, to notify the non-target APs that the non-target APs are not selected to participate in coordinated transmission. Different from a manner in the conventional technology in which channel state information required by all APs that participate in channel sounding needs to be fed back, this application effectively reduces channel overheads and improves resource utilization.

In an embodiment, before the STA sends the channel measurement report frame, the method further includes: The STA sends or receives a feedback type indication, where the feedback type indication is used to indicate a type of feedback of channel state information by the STA, and types of feedback of channel state information by the STA include selective feedback and nonselective feedback.

In this application, the feedback type indication may be sent by the STA or may be sent by the AP. The STA and/or the AP may notify, by sending the feedback type indication, the STA, or the AP, or the AP and the STA that a feedback manner in which the STA selects a target AP and selectively feeds back channel state information is to be used.

In an embodiment, the selective feedback indicates that the STA feeds back channel state information of some of the n APs, and the nonselective feedback indicates that the STA feeds back the channel state information of each of the n APs.

In this way, the STA and/or the AP may learn, before the STA performs feedback, whether a current feedback procedure is selective feedback. If the current feedback procedure is selective feedback, when obtaining the channel state information, an AP may determine that the AP is selected to participate in coordinated transmission; or when obtaining no channel state information, an AP may determine that the AP is not selected. In a case of nonselective feedback, the AP and the STA may perform feedback in a regular feedback manner.

In an embodiment, the channel measurement report frame includes a multiple-input multiple-output control field, and a feedback type field of the multiple-input multiple-output control field is a reserved value used to indicate that a type of feedback of channel state information by the STA is selective feedback.

The reserved value in the feedback type field is set, so that the AP and the STA determine that a feedback manner of the channel state information is selective feedback, to be different from other manners of nonselective feedback.

In an embodiment, the channel state information of the m target APs satisfies a preset condition. If coordinated transmission is joint transmission, m APs with best channel state information in the n APs satisfy the preset condition; or if coordinated transmission is coordinated beamforming transmission, p APs with best channel state information in the n APs and q APs with worst channel state information in the n APs satisfy the preset condition, where a sum of p and q is equal to m.

In this way, the STA may determine, based on different coordinated transmission modes, an AP corresponding to a channel state that satisfies the preset condition.

In an embodiment, the method further includes: The STA receives first data sent by a primary AP, where the first data is data shared among the m target APs, and the primary AP is included in the m target APs; and if the STA fails to receive the first data, the STA sends a retransmission request frame to p retransmission APs in the m target APs, where the retransmission request frame is used to indicate the p retransmission APs to resend the first data, and p is an integer greater than or equal to 1 and less than or equal to m.

In this way, a data retransmission mode in coordinated transmission is implemented, and when the STA fails to receive the first data, the STA may select the p retransmission APs and request the retransmission APs to resend the first data.

In an embodiment, the retransmission request frame includes a destination address field, a retransmission AP information field, a retransmission mode field, and a transmitting address indication field, where the destination address field is a broadcast address or address information of the retransmission AP; the retransmission AP information field includes identification information of the retransmission AP; the retransmission mode field is used to indicate whether joint transmission is to be used to retransmit the first data; and the transmitting address indication field is used to indicate address information of the primary AP that is carried in the first data.

In this way, the STA may indicate, by using the retransmission request frame, the retransmission AP to send the first data. In an embodiment, the resent first data may include the address information carried in the transmitting address indication field.

In an embodiment, if the p retransmission APs are not primary APs, the method further includes: receiving the first data retransmitted by the retransmission AP, where the first data includes the address information of the primary AP; and performing joint software decoding based on the first data retransmitted by the retransmission AP and the first data sent by the primary AP, to obtain first data obtained through the joint software decoding.

In this way, the STA may select an AP other than the primary AP as the retransmission AP. In addition, when the retransmission AP sends the first data, the first data may carry the address information of the primary AP, namely, an AP that sends the first data the last time, so that the STA may perform joint software decoding on same data (the first data) that is received at least twice, to improve a decoding success rate.

According to a second aspect, an embodiment of this application provides a channel sounding method. The method may include: An AP sends a channel sounding frame, where the channel sounding frame is used by a station STA to perform channel sounding based on the channel sounding frame to obtain channel state information. The access point receives feedback information sent by the STA.

The AP determines, based on the feedback information, whether the AP is selected by the STA to participate in coordinated transmission.

In an embodiment, an operation of determining, based on the feedback information, whether the AP is selected by the STA to participate in coordinated transmission may include: receiving a channel measurement report frame fed back by the STA, and identifying whether the channel measurement report frame includes identification information and channel state information of the AP; and if the identification information and the channel state information are identified, determining that the AP is selected to participate in coordinated transmission.

In an embodiment, an operation of determining, based on the feedback information, whether the AP is selected by the STA to participate in coordinated transmission may alternatively include: The AP receives indication information sent by the STA, where the indication information is used to indicate that the AP is not selected to participate in coordinated transmission. The AP determines, based on the indication information, that the AP is not selected to participate in coordinated transmission.

In an embodiment, the indication information includes channel quality information of the AP and an identifier of the AP; or the indication information includes non-selection indication information and an identifier of the AP, where the non-selection indication information is used to indicate that the AP is not selected.

In an embodiment, before the STA feeds back the channel measurement report frame, the method further includes: The AP sends or receives a feedback type indication, where the feedback type indication is used to indicate a type of feedback of channel state information by the STA, and types of feedback of channel state information by the STA include selective feedback and nonselective feedback.

In an embodiment, the method further includes: The AP receives first data that is sent by a primary AP to the AP and the STA. The AP receives a retransmission request frame sent by the STA, where the retransmission request frame is sent to the AP by the STA after the STA fails to receive the first data, and the retransmission request frame is used to indicate the AP to resend the first data. The AP sends the first data to the STA.

In an embodiment, the retransmission request frame includes a transmitting address indication field used to indicate address information of the primary AP that sends the first data. The method further includes: The AP sends the first data including the address information of the primary AP to the STA.

According to a third aspect, an embodiment of this application provides a communication apparatus applied to a STA, where the apparatus may include a transceiver module and an obtaining module. The transceiver module may be configured to receive channel sounding frames sent by n APs, where n is an integer greater than 1. The obtaining module may be configured to perform channel sounding based on the channel sounding frames to obtain channel state information of each AP. The transceiver module may be further configured to send a channel measurement report frame, where the channel measurement report frame includes channel state information of m target APs in the n APs and identifiers of the m target APs, and the channel measurement report frame is further used to indicate that the m target APs are selected to participate in coordinated transmission, where m is an integer greater than 1 and less than or equal to n.

In an embodiment, the transceiver module may be further configured to send indication information, where the indication information is used to indicate that (n−m) non-target APs are not selected to participate in coordinated transmission.

In an embodiment, the indication information includes channel quality information of the (n−m) non-target APs and identifiers of the (n−m) non-target APs; or the indication information includes non-selection indication information and identifiers of the (n−m) non-target APs, where the non-selection indication information is used to indicate that the (n−m) non-target APs are not selected, and the channel quality information is used to indicate channel quality of channels between the non-target APs and the STA.

In an embodiment, the transceiver module is further configured to: send or receive a feedback type indication, where the feedback type indication is used to indicate a type of feedback of channel state information by the STA, and types of feedback of channel state information by the STA include selective feedback and nonselective feedback.

In an embodiment, the selective feedback indicates that the STA feeds back channel state information of some of the n APs, and the nonselective feedback indicates that the STA feeds back the channel state information of each of the n APs.

In an embodiment, the channel measurement report frame includes a multiple-input multiple-output control field, and a feedback type field of the multiple-input multiple-output control field is a reserved value used to indicate that a type of feedback of channel state information by the STA is selective feedback.

In an embodiment, the channel state information of the m target APs satisfies a preset condition. If coordinated transmission is joint transmission, m APs with best channel state information in the n APs satisfy the preset condition; or if coordinated transmission is coordinated beamforming transmission, p APs with best channel state information in the n APs and q APs with worst channel state information in the n APs satisfy the preset condition, where a sum of p and q is equal to m.

In an embodiment, the transceiver module is further configured to: receive first data sent by a primary AP, where the first data is data shared among the m target APs, and the primary AP is included in the m target APs; and if the STA fails to receive the first data, send a retransmission request frame to p retransmission APs in the m target APs, where the retransmission request frame is used to indicate the p retransmission APs to resend the first data, and p is an integer greater than or equal to 1 and less than or equal to m.

In an embodiment, the retransmission request frame includes a destination address field, a retransmission AP information field, a retransmission mode field, and a transmitting address indication field, where the destination address field is a broadcast address or address information of the retransmission AP; the retransmission AP information field includes identification information of the retransmission AP; the retransmission mode field is used to indicate whether joint transmission is to be used to retransmit the first data; and the transmitting address indication field is used to indicate address information of the primary AP that is carried in the first data.

In an embodiment, if the p retransmission APs are not primary APs, the transceiver module is further configured to: receive the first data retransmitted by the retransmission AP, where the first data includes the address information of the primary AP. Correspondingly, the STA further includes a decoding module, configured to perform joint software decoding based on the first data retransmitted by the retransmission AP and the first data sent by the primary AP, to obtain first data obtained through the joint software decoding.

According to a fourth aspect, an embodiment of this application provides a communication apparatus applied to an AP. The communication apparatus includes a transceiver module and a processing module. The transceiver module may be configured to send a channel sounding frame, where the channel sounding frame is used by a STA to perform channel sounding based on the channel sounding frame to obtain channel state information. The transceiver module is further configured to receive feedback information sent by the STA. The processing module may be configured to determine, based on the feedback information, whether the AP is selected by the STA to participate in coordinated transmission.

In an embodiment, the transceiver module is further configured to receive a channel measurement report frame fed back by the STA. The processing module is further configured to identify whether the channel measurement report frame includes identification information and channel state information of the AP. If the identification information and the channel state information are identified, the processing module determines that the AP is selected to participate in coordinated transmission.

In an embodiment, the transceiver module is further configured to receive indication information sent by the STA, where the indication information is used to indicate that the AP is not selected to participate in coordinated transmission. The processing module is further configured to determine, based on the indication information, that the AP is not selected to participate in coordinated transmission.

In an embodiment, the indication information includes channel quality information of the AP and an identifier of the AP; or the indication information includes non-selection indication information and an identifier of the AP, where the non-selection indication information is used to indicate that the AP is not selected.

In an embodiment, the transceiver module is further configured to: send or receive a feedback type indication, where the feedback type indication is used to indicate a type of feedback of channel state information by the STA, and types of feedback of channel state information by the STA include selective feedback and nonselective feedback.

In an embodiment, the transceiver module is further configured to: receive first data that is sent by a primary AP to the AP and the STA; receive a retransmission request frame sent by the STA, where the retransmission request frame is sent to the AP by the STA after the STA fails to receive the first data, and the retransmission request frame is used to indicate the AP to resend the first data; and send the first data to the STA.

In an embodiment, the retransmission request frame includes a transmitting address indication field used to indicate address information of the primary AP that sends the first data. The transceiver module is further configured to: send the first data including the address information of the primary AP to the STA.

According to a fifth aspect, an embodiment of this application provides an apparatus. The apparatus may be a STA device or may be a chip in a STA. The apparatus has a function of implementing the STA in the first aspect. The function may be implemented by hardware, or may be implemented by hardware executing corresponding software. The hardware or the software includes one or more units corresponding to the foregoing function.

In an embodiment, when the apparatus is the STA, the STA includes a processor and a transceiver. The processor is configured to support the STA to perform corresponding functions in the foregoing aspects. The transceiver is configured to support communication between the STA and an AP, and send information or instructions used in the foregoing methods to the AP. Optionally, the STA may further include a memory. The memory is configured to be coupled to the processor, and store program instructions and data that are necessary for the STA.

In an embodiment, the apparatus includes a processor, a baseband circuit, a radio frequency circuit, and an antenna. The processor is configured to control functions of each circuit part. The baseband circuit is configured to generate various signaling and messages such as a buffer indication message, and send, to the AP through the antenna, signaling and messages obtained through processing of the radio frequency circuit such as analog conversion, filtering, amplification, and up-conversion. In an embodiment, the apparatus may further include a memory. The memory stores program instructions and data that are necessary for the STA.

In an embodiment, the apparatus may include a processor and a modem. The processor may be configured to run instructions or an operating system to control the function of the STA. The modem may encapsulate, encode/decode, modulate/demodulate, and equalize data according to a protocol to generate signaling information such as a channel sounding report frame, to support the STA to perform a corresponding function in the first aspect.

In an embodiment, when the apparatus is the chip in the STA, the chip includes a processing module and a transceiver module. The processing module may be, for example, a processor. For example, the processor is configured to generate various messages and signaling, encapsulates the various messages according to a protocol, and perform processing such as encoding, modulation, and amplification on the various messages. The processor may be further configured to perform demodulation, decoding, and decapsulation to obtain the signaling and messages. The transceiver module may be, for example, an input/output interface, a pin, or a circuit on the chip. The processing module may execute computer-executable instructions stored in a storage unit, to support the STA to perform corresponding functions in the foregoing aspects. In an embodiment, the storage unit may be a storage unit in the chip, for example, a register or a cache. The storage unit may alternatively be a storage unit in the STA that is located outside the chip, for example, a read-only memory (ROM), another type of static storage device that may store static information and instructions, or a random access memory (RAM).

In an embodiment, the apparatus includes a processor. The processor is configured to be coupled to a memory, and read instructions in the memory and perform the method related to the STA in the first aspect according to the instructions. The memory may be located inside the processor, or may be located outside the processor.

The processor mentioned anywhere above may be a general-purpose central processing unit (Central Processing Unit, CPU for short), a microprocessor, an application-specific integrated circuit (application-specific integrated circuit, ASIC for short), or one or more integrated circuits configured to control program execution of the channel sounding method in the foregoing aspects.

According to a sixth aspect, this application provides an apparatus. The apparatus may be an AP or may be a chip in an AP. The apparatus has a function of implementing the AP in the second aspect. The function may be implemented by hardware, or may be implemented by hardware executing corresponding software. The hardware or the software includes one or more units corresponding to the foregoing function.

In an embodiment, when the apparatus is the AP, the AP includes a processor and a transceiver. The processor is configured to support the AP to perform corresponding functions in the foregoing methods. The transceiver is configured to support communication between APs or between an AP and a station, and receive information or instructions, for example, a channel measurement report frame, that is sent by the STA in the foregoing methods. In an embodiment, the AP may further include a memory. The memory is configured to be coupled to the processor, and store program instructions and data that are necessary for the AP.

In an embodiment, the apparatus includes a processor, a baseband circuit, a radio frequency circuit, and an antenna. The processor is configured to control functions of each circuit part. The radio frequency circuit may perform processing such as digital conversion, filtering, amplification, and down-conversion on signaling sent by the STA and received through the antenna, and then obtain signaling information after decoding and protocol-based decapsulation are performed by the baseband circuit. In an embodiment, the apparatus further includes a memory. The memory stores program instructions and data that are necessary for the AP.

In an embodiment, the apparatus includes a processor and a modem. The processor may be configured to run instructions or an operating system to control functions of the AP. The modem may encapsulate, encode/decode, modulate/ demodulate, and equalize data according to a protocol to generate a channel sounding frame, parse a channel measurement report frame, or the like, to support the AP to perform corresponding functions in the second aspect.

In an embodiment, when the apparatus is the chip in the AP, the chip includes a processing module and a transceiver module. The processing module may be, for example, a processor. The processor may be configured to perform processing such as filtering, demodulation, power amplification, and decoding on signaling received by using the transceiver module. The transceiver module may be, for example, an input/output interface, a pin, or a circuit on the chip. The processing module may execute computer-executable instructions stored in a storage unit, to support the AP to perform corresponding functions in the second aspect. In an embodiment, the storage unit may be a storage unit in the chip, for example, a register or a cache. The storage unit may alternatively be a storage unit in the AP that is located outside the chip, for example, a read-only memory (read-only memory, ROM for short), another type of static storage device that may store static information and instructions, or a random access memory (random access memory, RAM for short).

In an embodiment, the apparatus includes a processor, where the processor is configured to couple to a memory, and read instructions in the memory and perform the method in the second aspect according to the instructions. The memory may be located inside the processor, or may be located outside the processor.

The processor mentioned anywhere above may be a general-purpose central processing unit, a microprocessor, an application-specific integrated circuit, or one or more integrated circuits configured to control program execution of the channel sounding method in the foregoing aspects.

According to a seventh aspect, this application provides a computer-readable storage medium, where the computer-readable storage medium stores instructions, and the instructions may be executed by one or more processors on a processing circuit. When the instructions are run on a computer, the computer is enabled to perform the method in any one of the foregoing first aspect and the second aspect or any possible implementation thereof.

According to an eighth aspect, a computer program product including instructions is provided. When the computer program product runs on a computer, the computer is enabled to perform the method in any one of the first aspect and the second aspect or any possible implementation thereof.

According to a ninth aspect, this application provides a chip system, where the chip system includes a processor, configured to support a data sending device to implement functions in the foregoing aspect such as generating or processing data and/or information in the foregoing aspects. In a possible design, the chip system further includes a memory, and the memory is configured to store program instructions and data that are necessary for the data sending device. The chip system may include a chip, or may include a chip and another discrete component.

According to a tenth aspect, an embodiment of this application provides a wireless communication system. The system includes at least one STA and at least one AP in the foregoing aspects.

BRIEF DESCRIPTION OF DRAWINGS

FIG. 2 is a schematic diagram of an example frame structure of a MIMO control field;

FIG. 9 is a schematic diagram of a frame structure of an indication frame according to an embodiment of this application;

FIG. 10 is a schematic diagram of a frame structure of a beamforming report frame according to an embodiment of this application;

FIG. 20 is a schematic diagram of a frame structure of a retransmission frame according to an embodiment of this application;

DESCRIPTION OF EMBODIMENTS

The following clearly describes technical solutions in embodiments of this application with reference to accompanying drawings in the embodiments of this application.

The term "and/or" in this specification describes only an association relationship for associated objects and represents that three relationships may exist. For example, A and/or B may represent the following three cases: Only A exists, both A and B exist, and only B exists.

In the specification and claims in the embodiments of this application, terms "first", "second", and the like are intended to distinguish between different objects but do not indicate a particular order of the objects. For example, a first target object, a second target object, and the like are used to distinguish between different target objects, but are not used to describe a specific order of the target objects.

In the embodiments of this application, the word "example" or "for example" is used to represent giving an example, an illustration, or a description. Any embodiment or design scheme described as an "example" or "for example" in the embodiments of this application shall not be explained as being more preferred or having more advantages than another embodiment or design scheme. Exactly, use of the term such as "example" or "for example" is intended to present a related concept in a specific manner.

In descriptions of the embodiments of this application, unless otherwise stated, "a plurality of" means two or more. For example, a plurality of processing units refer to two or more processing units; and a plurality of systems refer to two or more systems.

Figure 3:
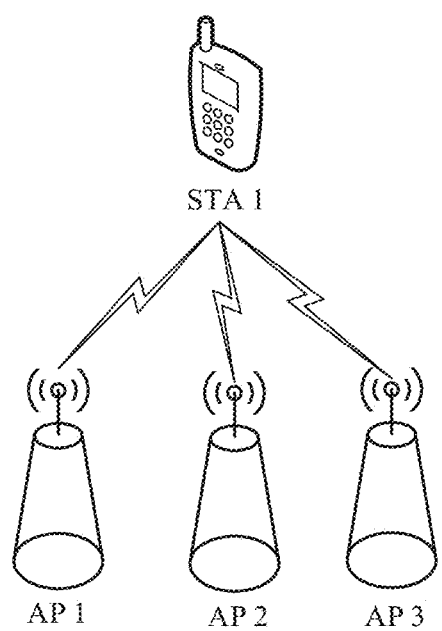
FIG. 3 is a schematic diagram of an application scenario according to an embodiment of this application.

Before the technical solutions in the embodiments of this application are described, a communication system in the embodiments of this application is first described with reference to the accompanying drawings. FIG. 3 is a schematic diagram of an application scenario according to an embodiment of this application. The application scenario includes an AP 1, an AP 2, an AP 3, and a STA. In a specific implementation process of the embodiments of this application, a STA is a communication apparatus that has a wireless transceiver function, for example, the STA may communicate with another network element according to the 802.11 protocol. The STA may also be referred to as a user terminal, a user apparatus, an access apparatus, a subscriber station, a subscriber unit, a mobile station, a user agent, user equipment, or another name. For example, the STA may be a device such as a computer, a smartphone, or a tablet computer. An AP is a communication apparatus that can provide a service for the STA and that has the wireless transceiver function. For example, the AP may communicate with another network element according to the 802.11 protocol. For example, the AP may be an access point, a router, a switch, a micro base station, or a small cell in a WLAN communication system. It should be noted that, in actual application, there is one or more APs, and there may be one or more STAs. A quantity of STAs and a quantity of APs in the application scenario shown in FIG. 3 are merely examples. This is not limited in this application.

A specific implementation solution of this application is described below with reference to the schematic diagram of the application scenario shown in FIG. 3.

In this application, a STA may select a collaborating AP based on channel state information that is obtained by performing channel measurement on channels of APs, and notify, by sending the channel state information or not, each AP whether each AP is selected. In other words, each AP may determine, depending on whether the channel state information is received, whether the AP is selected to participate in coordinated transmission.

In this embodiment of this application, a scenario in which the STA sends channel state information required by a selected AP to the AP and does not feed back any result to an unselected AP is denoted as a scenario 1. A scenario in which the STA sends channel state information required by a selected AP to the AP and sends, to an unselected AP, some channel state information but not all channel state information required by the AP is denoted as a scenario 2. In this embodiment of this application, a scenario of a coordinated transmission procedure performed based on channel state information and a feedback result of the STA is denoted as a scenario 3. The scenarios are described in detail below with reference to FIG. 3.

Scenario 1

Figures 4, 5:
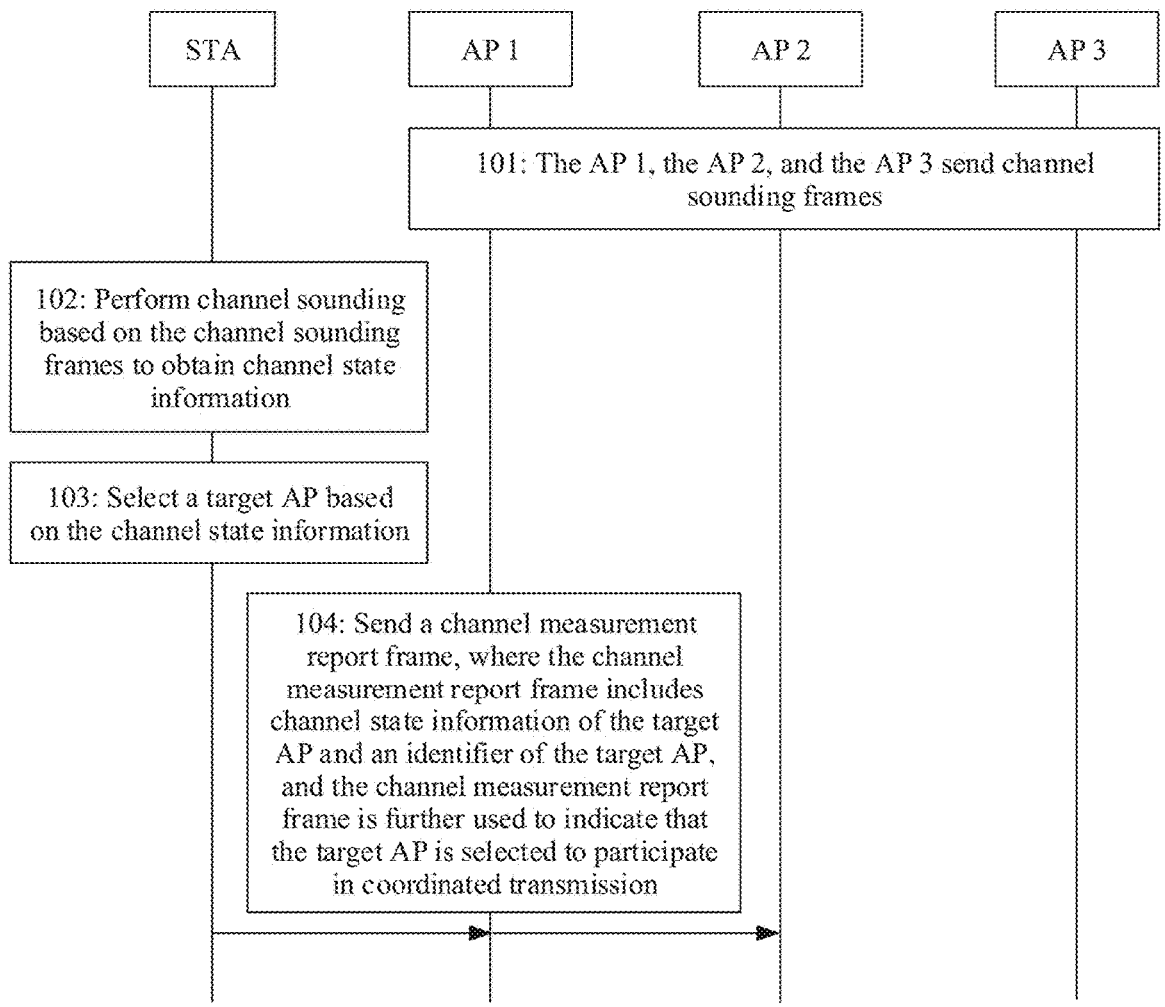
FIG. 4 is a schematic flowchart of a channel sounding method according to an embodiment of this application.
FIG. 5 is a schematic diagram of a frame structure of an announcement frame according to an embodiment of this application.

With reference to FIG. 3, FIG. 4 is a schematic flowchart of a channel sounding method according to an embodiment of this application. FIG. 4 includes the following operations.

Operation 101: n APs send channel sounding frames to a STA, where n is an integer greater than 1.

In an embodiment, in this embodiment of this application, before sending the channel sounding frames, the APs send NDPA frames, to indicate the STA to perform channel sounding on channels of the APs. In an embodiment, both a primary AP and secondary APs may send the NDPA frames. In other words, the APs each may send the NDPA frame and an NDP frame. In an embodiment, only one AP may send the NDPA frame. This is not limited in this application.

For example, the AP 1 may send an NDPA frame to announce a STA and APs that participate in channel sounding. For example, if the APs that participate in channel sounding include the AP 1, the AP 2, and the AP 3, the AP 1 broadcasts the NDPA frame to indicate the STA in FIG. 3 to perform channel sounding on channels of the AP 1, the AP 2, and the AP 3.

For another example, the AP 1 may broadcast the NDPA frame to indicate the STA to perform channel sounding based on an NDP frame sent by the AP 1, and then the AP 1 sends the NDP frame; then, the AP 2 also broadcasts an NDPA frame to indicate the STA to perform channel sounding based on an NDP frame sent by the AP 2; and the same goes for the AP 3.

Operation 102: The STA performs channel sounding on channels of then APs to obtain channel state information.

In this application, for example, after receiving the NDP frames/NDP frame sent by the AP 1, the AP 2, and/or the AP 3, the STA may perform channel sounding on the channels/channel of the AP 1, the AP 2, and/or the AP 3 based on the NDP frames/NDP frame, to obtain the channel state information.

In an embodiment, channel state information is information reflecting a condition of a channel between an AP and a STA, and may represent a characteristic of the channel between the AP and the STA. The AP may obtain a state of a downlink channel between the AP and the STA based on channel state information fed back by the STA, and communicate (send/receive signaling or data) with the STA on the channel based on the channel state.

Operation 103: The STA selects m target APs from the n APs based on the channel state information.

In this embodiment of this application, the STA may match channel state information of each AP with a preset condition. An AP whose channel state information satisfies the preset condition is a target AP, and an AP whose channel state information does not satisfy the preset condition is a non-target AP.

In an embodiment, if coordinated transmission is joint transmission, the preset condition may be selecting an AP with best channel state information. If coordinated transmission is coordinated beamforming transmission, the preset condition may be selecting an AP with best channel state information and an AP with worst channel state information as target APs. In an embodiment, when coordinated transmission is coordinated beamforming transmission and an AP associated with the STA has been selected, the m target APs may be alternatively APs with worst channel state information. In an implementation, the best channel state information may mean that the channel state information is greater than or equal to an upper threshold, and the worst channel state information may mean that the channel state information is less than or equal to a lower threshold. In another implementation, the best channel state information may mean that the channel state information is the largest, and the worst channel state information may mean that the channel state information is the smallest.

For example, if coordinated transmission is joint transmission, the STA may select m APs with relatively good channel states in the n APs as target APs.

In an embodiment, if coordinated transmission is coordinated beamforming transmission, the STA may select m APs with relatively bad channel states in the n APs as target APs, and the selected m target APs are to be associated with another STA during coordinated beamforming transmission. In an embodiment, if k APs (k is an integer greater than or equal to 1) for performing coordinated transmission with the STA have been selected, the STA selects m target APs from (n−k) APs in the n APs except the k APs. This reduces interference from channels between the m target APs and the another STA to channels between the k APs and the STA in FIG. 1. For example, when the primary AP has been selected (for example, the AP 1 is the primary AP), the STA may select an AP (for example, the AP 3) with relatively bad channel state information from the AP 2 and the AP 3 as a target AP. The target AP is to be associated with another STA (not shown in the figure). In subsequent coordinated beamforming transmission, the AP 1 sends data 1 to the STA, and the AP 3 sends data 2 to the another STA.

In an embodiment, if coordinated transmission is coordinated beamforming transmission, the STA may alternatively select m APs with best channel state information and worst channel state information as target APs, where a ratio between a quantity of APs corresponding to the best sounding result and a quantity of APs corresponding to the worst channel state information may be set based on an actual requirement. For example, when n=4, two target APs may be set to be selected, where one AP with best channel state information and one AP with worst channel state information may be selected to perform coordinated beamforming transmission, to provide a service for the STA.

In this application, when the STA selects the target AP based on the foregoing preset condition, the STA selects the target AP after obtaining the channel state information of the n APs and performs a subsequent feedback procedure. In an embodiment, the STA may alternatively use an instantaneous determining and feedback manner. The STA may perform channel sounding on the channels of the APs to obtain channel quality information; and an AP may determine, based on the channel quality information, that the state of the downlink channel is good or bad. If determining that the state of the downlink channel is good (a specific determining manner is described in the following embodiment), the AP selects a corresponding AP as a target AP and feeds back channel state information to the target AP.

It should be noted that the channel quality information may be any indicator that can reflect quality of a channel between a STA and an AP. However, the channel quality information cannot enable the AP to obtain, based on the indicator, a channel characteristic required for data transmission through the downlink channel. In other words, the AP may determine, based on the channel quality information, that the state of the downlink channel is good or bad, but the AP cannot obtain, based on the channel quality information, all channel characteristics required for data transmission through the downlink channel. Consequently, the AP cannot perform a subsequent data transmission process. Compared with a manner of obtaining the channel state information, a manner of obtaining the channel quality information is easier and faster, so that after obtaining the channel quality information, the STA can determine whether a channel state of an AP satisfies the preset condition or whether an AP can participate in coordinated transmission as a target AP. An information amount of a channel characteristic represented by the channel quality information is less than an information amount of a channel characteristic represented by the channel state information. In an embodiment, the channel quality information includes but is not limited to a signal strength indication (Received Signal Strength Indication, RSSI), a signal-to-noise ratio (Signal-to-Noise Ratio, SNR), a signal-to-interference-plus-noise ratio (Signal-to-Interference-plus-Noise-Ratio, SINR), a channel correlation, or the like.

In an embodiment, if coordinated transmission is joint transmission, the preset condition may be that channel quality information of an AP is greater than or equal to a first threshold. In an embodiment, if coordinated transmission is coordinated beamforming transmission, the preset condition may be that the channel quality information of the AP is less than or equal to a second threshold. It should be noted that the first threshold and the second threshold may be stipulated by a protocol, or may be assigned to the STA after being determined by the AP, or may be determined by the STA. This is not limited in this embodiment of this application.

In an embodiment, if coordinated transmission is joint transmission, the STA may set the first threshold, and select an AP with channel quality information greater than or equal to the first threshold as a target AP. Both the channel quality information and the first threshold may be indicators such as the RSSI, the SNR, the SINR, or the channel correlation. For example, after the STA performs sounding on the channel of the AP 2, an obtained indicator is the RSSI; and if coordinated transmission is joint transmission, the STA compares the RSSI with a preset RSSI (which may be set based on an actual requirement), and determines the AP 2 as a target AP if the RSSI is greater than or equal to the preset RSSI. Other optional thresholds may be set based on an actual requirement. This is not limited in this application.

In an embodiment, if coordinated transmission is coordinated beamforming transmission, the STA may set the second threshold, and select an AP with channel quality information less than or equal to the second threshold as a target AP. Both the channel quality information and the second threshold may be indicators such as the RSSI, the SNR, the SINR, or the channel correlation. In addition, the second threshold may be the same as or different from the first threshold. This is not limited in this application.

Refer to FIG. 3. In operation 103, for example, the STA selects the AP 1 and the AP 2 from the AP 1, the AP 2, and the AP 3 as target APs for participating in coordinated transmission, and the AP 3 is a non-target AP that is not selected for coordinated transmission.

Operation 104: The STA sends a channel measurement report frame, where the channel measurement report frame includes channel state information of the m target APs in the n APs and identifiers of the m target APs, and the channel measurement report frame is further used to indicate that the m target APs are selected to participate in coordinated transmission.

In an embodiment, the channel measurement report frame may be a beamforming report frame, and the channel state information may be carried in a beamforming report field included in the beamforming report frame. The channel state information may be a compressed channel characteristic, or may be an uncompressed channel characteristic. For example, the channel state information may be a compressed beamforming report or an uncompressed beamforming report. Performing feedback in a compression manner may further reduce overheads on feedback of channel state information.

In this application, based on operation 103, the STA may select the m target APs for participating in coordinated transmission. Then, the STA may send, to the selected m target APs, the channel measurement report frame including identification information and channel state information of the target APs, to notify the m APs that the m APs are selected to participate in coordinated transmission. For example, FIG. 4 is still used as an example. The STA sends the channel measurement report frame, where the channel measurement report frame includes identification information of the m target APs (including the AP 1 and the AP 2) and channel state information of the AP 1 and the AP 2. The channel measurement report frame may be used to feed back the channel state information of the AP 1 and the AP 2, and may further be used to indicate that the AP 1 and the AP 2 are selected as target APs for participating in coordinated transmission. In an embodiment, the STA may send, in a unicast manner, m channel measurement report frames in sequence, and one channel measurement report frame carries a channel measurement result and an identifier of one target AP. Correspondingly, an AP that receives the channel measurement report frame may determine that the AP is selected to participate in coordinated transmission, and may obtain corresponding channel state information from the channel measurement report frame.

In an embodiment, the STA may send, in a broadcast manner, a channel measurement report frame, where the channel measurement report frame includes channel measurement results of the m target APs and the identification information of the m target APs. Correspondingly, an AP that receives the broadcast channel measurement report frame may determine, based on the identification information in the channel measurement report frame, whether the AP is selected. If the AP successfully matches identification information of the AP with the identification information in the channel measurement report frame, the AP may determine that the AP is selected, and the AP may obtain corresponding channel state information from the report frame. Correspondingly, if the AP fails to match the identification information of the AP with the identification information in the channel measurement report frame, the AP is an AP that is not selected to participate in coordinated transmission, and may be referred to as a non-target AP. Manners of notifying, by using the channel measurement report frame in the unicast and broadcast manners, an AP whether the AP is selected are separately described in detail below.

(1) the Channel Measurement Report Frame is Sent in the Unicast Manner.

The STA may separately feed back the channel measurement report frames of the m target APs to the m target APs, and the channel measurement report frame includes the identification information and the channel state information of the target APs.

For example, refer to FIG. 3. The STA may send a channel measurement report frame to the AP 1, and a destination address of the frame is address information of the AP 1. In an embodiment, the address information may be MAC address information. After monitoring the channel measurement report frame, the AP 1 identifies that address information of the channel measurement report frame (namely, the identification information of the target AP described in this embodiment of this application) matches local address information of the AP 1. In this case, the AP 1 receives the channel measurement report frame, and identifies that the channel measurement report frame includes the channel state information of the AP 1; and when obtaining the channel state information, the AP 1 may determine that the AP 1 is a target AP selected to participate in coordinated transmission. It should be noted that the address information in the channel measurement report frame may be the identification information of the AP in this application. In other words, when the AP identifies that the identification information matches local identification information (local address information), and the frame includes channel state information, the AP may determine that the AP is a selected target AP. In an embodiment, the channel measurement report frame may further carry other identification information that can identify the AP 1, for example, an association identifier (AID), other than the address information. Correspondingly, after receiving the channel measurement report frame, the AP 1 may determine whether the AP 1 is selected as the target AP by identifying whether the channel measurement report frame includes an AID of the AP 1 and the corresponding channel state information. In addition, the STA may send a channel measurement report frame to the AP 2, and a destination address of the frame is address information of the AP 2. In addition, the channel measurement report frame includes channel state information of the AP 2, to notify the AP 2 that the AP 2 is selected to participate in coordinated transmission.

In an embodiment, as described above, if the channel measurement report frame is sent in the unicast manner, for unselected (n−m) non-target APs, the STA may notify, by feeding back no channel measurement report frame to the no-target APs, the non-target APs that the non-target APs are not selected to participate in coordinated transmission. In other words, in this embodiment, if an AP receives no channel measurement report frame at a specified moment, the AP may determine that the AP is not selected to participate in coordinated transmission. In an embodiment, the specified moment may be preset duration later than a moment at which the AP sends an NDP frame, and the preset duration may be set based on an actual requirement, for example, may be SIFS. This is not limited in this application. Alternatively, the specified moment may be preset duration later than a moment at which NDP frames of all the APs are sent, and the specified moment may be set based on an actual requirement. This is not limited in this application.

In an embodiment, in this application, the channel measurement report frame may be a beamforming report frame, and the beamforming report frame includes but is not limited to a MIMO control field and a beamforming report field. In an embodiment, the channel state information may be carried in the beamforming report field.

In an embodiment, in this application, the MIMO control field may include information used to indicate that a type of feedback of channel state information by the STA is selective feedback. In an embodiment, the information may be carried in a feedback type field in the MIMO control field. In an embodiment, the feedback type field may represent the information by setting a preset value. For example, the parameter value in the feedback type field may be set to 3, to indicate that a current feedback type is selective feedback.

Figure 1:
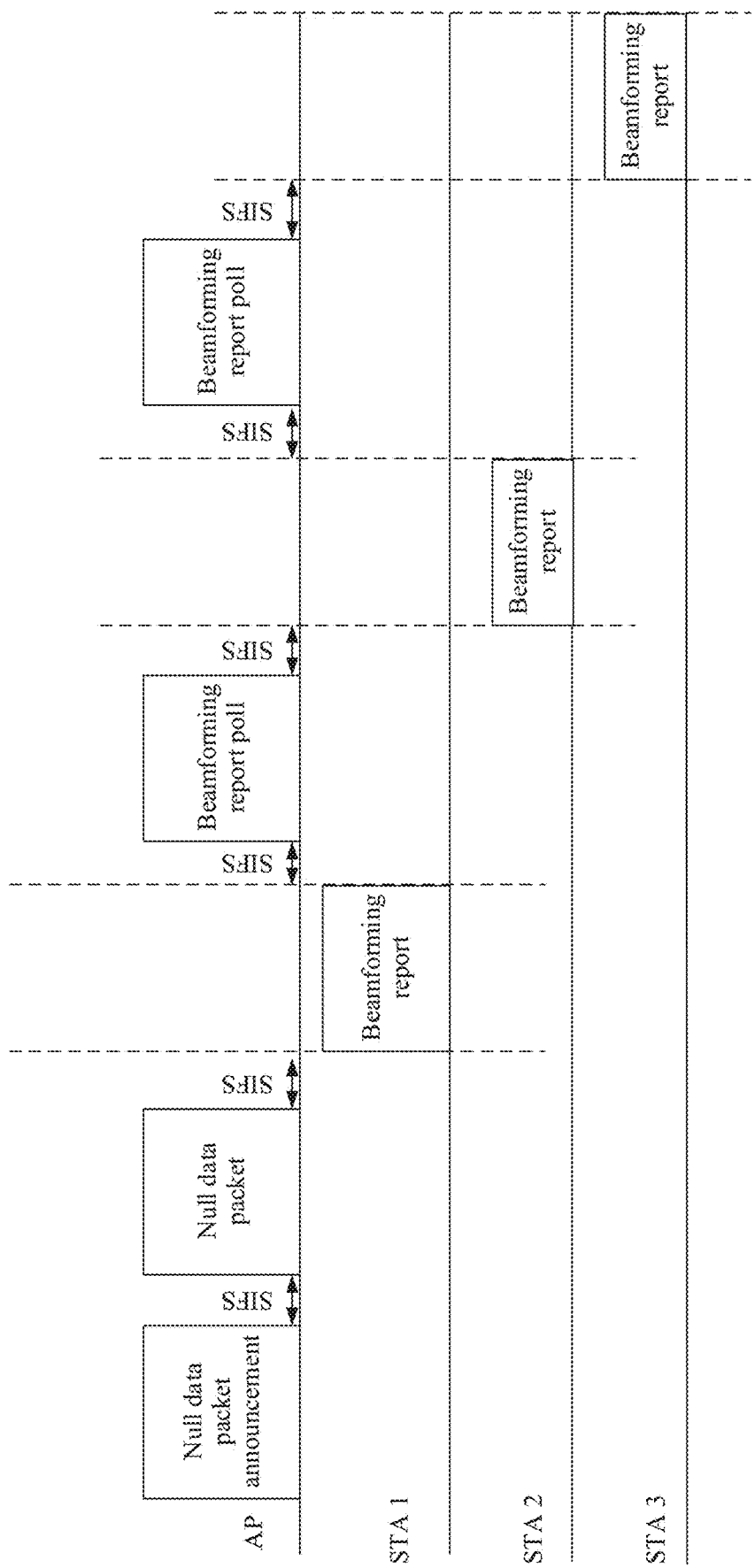
FIG. 1 is a schematic diagram of an example channel sounding procedure.

It should be noted that selective feedback in this application means that the STA selects a target AP, and the STA feeds back channel state information to only some APs, for example, target APs (selected APs). On the contrary, nonselective feedback is another feasible feedback manner, for example, a feedback manner in which the STA feeds back channel state information to each of then APs that participate in channel sounding. For example, as shown in FIG. 1, the AP 1, the AP 2, and the AP 3 participate in channel sounding, and nonselective feedback is that the STA needs to feed back channel state information to the AP 1, the AP 2, and the AP 3. Selective feedback in this application is that the STA may feed back channel state information to the AP 1 and the AP 2 but feed back no channel state information to the AP 3.

It should be noted that in the nonselective feedback manner, a value of the feedback type field in the MIMO control field may be 0, 1, 2, or 3. 0, 1, and 2 are used to indicate other functions, and in this application, the value 3 may be used to indicate that a feedback type is selective feedback, or another field or a reserved bit in the MIMO control field may be used to indicate that a feedback type is selective feedback. This is not limited in this application.

(2) the Channel Measurement Report Frame is Sent in the Broadcast Manner.

In an embodiment, after obtaining the channel state information of the AP, the STA generates the channel measurement report frame, and a destination address in the channel measurement report frame is a broadcast address. In the broadcast manner, channel occupation may be further reduced, and channel overheads are reduced.

The channel measurement report frame may include the identification information and the channel state information of the target APs. In an embodiment, an AP that receives the channel measurement report frame may match local identification information with the identification information carried in the frame, to determine whether the AP is a target AP. For example, if the local identification information matches the identification information carried in the frame, the AP may determine that the AP is a target AP and extract corresponding channel state information. Otherwise, if the local identification information does not match the identification information carried in the frame, the AP may determine that the AP is a non-target AP and is not selected to participate in coordinated transmission. In an embodiment, for example, if the channel measurement report frame is a beamforming report, identification information of an AP may be carried in a MIMO control field, or in a MIMO control field and a beamforming report field, or in a beamforming report field. In an embodiment, the identification information of the AP may be alternatively carried in another frame that is sent before the channel measurement report frame. The identification information of the AP may be an order indication of the AP used to indicate a location of a field belonging to each AP in a beamforming report frame. In this way, the AP may determine, based on the order indication of the AP, a location of a beamforming report field of the AP in the channel measurement report frame, to obtain channel state information of the AP. In an embodiment, the identification information of the AP or the order indication of the AP may be carried in an NDPA frame or a channel measurement report trigger frame.

In an embodiment, the channel measurement report frame may include a plurality of STA information fields (which may also be referred to as AP information fields), and each STA information field one-to-one corresponds to the target AP. In an embodiment, identification information and channel state information of an AP may be correspondingly carried in a STA information field. For example, identification information and channel state information of the AP 1 may be carried in a STA information field 1, and identification information and channel state information of the AP 2 may be carried in a STA information field 2. The AP may determine, by reading the identification information in the STA field, that channel state information carried in the field is channel state information required by the AP and obtain the channel state information. In an embodiment, the identification information and the channel state information of each AP in the channel measurement report frame may be distinguished by using a separator. A manner of separating identification information and channel state information of different APs in the broadcast channel measurement report frame is not limited to the foregoing separation manners. This is not limited in this application.

In an embodiment, in this application, to implement the selective feedback manner in this embodiment of this application, the AP and the STA may also exchange feedback type indications, so that both the AP and the STA can learn of a feedback type. For example, an AP (namely, a primary AP, for example, the AP 1, or any AP, which is not limited in this application) may send a feedback type indication, to notify another AP and/or the STA that the selective feedback manner or the nonselective feedback manner (for specific implementations of selective feedback and nonselective feedback, refer to the foregoing description) is used in a feedback procedure. In an embodiment, in this application, the feedback type indication may be alternatively sent by the STA. This is not limited in this application.

In an embodiment, in this application, the feedback type indication may be carried in an announcement frame. The announcement frame may be sent at any moment before the STA feeds back the channel measurement report frame. In an embodiment, in this application, the announcement frame may include a feedback type indication field used to carry the feedback type indication. A length of the feedback type indication field may be 2 bits. In an example, a value corresponding to the feedback type indication and an indication function of the value are shown in Table 1. Certainly, different indication functions corresponding to different values of the feedback type may be changed.

TABLE 1

| Value | | Indication function |
|---|---|---|
| 0 | 0 | Indicate that a nonselective feedback manner is used in a feedback procedure |
| 0 | 1 | Indicate that a selective feedback manner is used in a feedback procedure, where all channel state information required by a selected target AP is fed back to the selected target AP, and no channel state information is fed back to a non-target AP |
| 1 | 0 | Indicate that a selective feedback manner is used in a feedback procedure, where all channel state information required by a selected target AP is fed back to the selected target AP, and channel quality information or indication information (used to indicate that a non-target AP is not selected) is fed back to the non-target AP |
| 1 | 1 | Reserved |

In an embodiment, in this application, a frame structure of the announcement frame is shown in FIG. 5. Refer to FIG. 5. The announcement frame further includes but is not limited to a frame control field, a receiving address field (which may also be referred to as a destination address field), a transmitting address field, and another field.

Figures 6, 7:
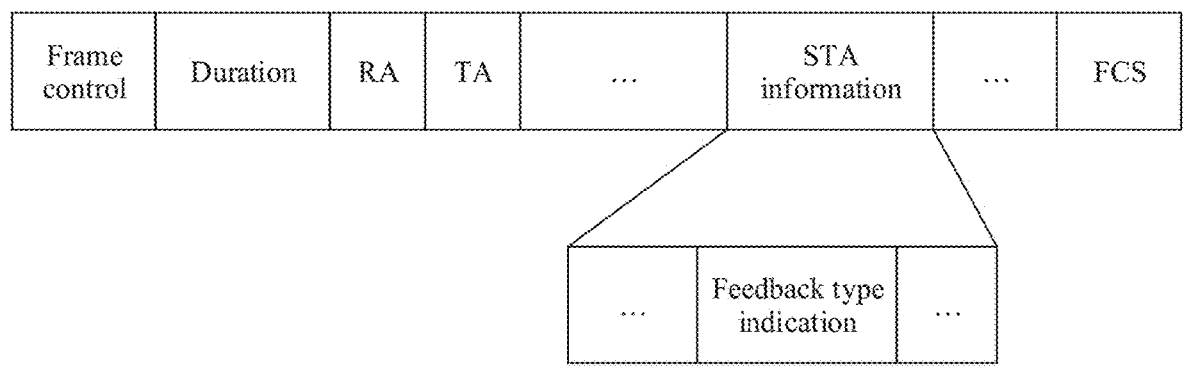
FIG. 6 is a schematic diagram of a frame structure of a channel measurement report frame according to an embodiment of this application.
FIG. 7 is a schematic diagram of a frame structure of an NDPA frame according to an embodiment of this application.

In an embodiment, in this application, the feedback type indication may be alternatively carried in a channel measurement report trigger frame that is sent by an AP (or may refer to a primary AP, for example, the AP 1). In an embodiment, the channel measurement report trigger frame may include a feedback type field, and the feedback type indication may be carried in the feedback type field. FIG. 6 is a schematic diagram of a frame structure of a trigger frame. For setting of a length and a parameter of the feedback type field, refer to the feedback type field in the announcement frame. Details are not described herein again. In addition, the trigger frame further includes other fields (for example, a frame control field, a receiving address field, and a transmitting address indication field). Details are not described in this application again.

In an embodiment, in this application, the feedback type indication may be alternatively carried in an NDPA frame. In an embodiment, the feedback type indication may be carried in a STA information field in the NDPA frame, to indicate that a feedback manner used by a STA corresponding to the STA information field is selective feedback. FIG. 7 is a schematic diagram of a frame structure of an NDPA frame according to this application. The NDPA includes a plurality of STA information fields separately corresponding to a STA 1, a STA 2, and a STA 3 (not shown in the figure of this application). The STA information field corresponding to the STA 1 includes a feedback type indication field, and a length of the field may be 2 bits. For setting of parameter values, refer to Table 2. Details are not described herein again.

Figure 8:
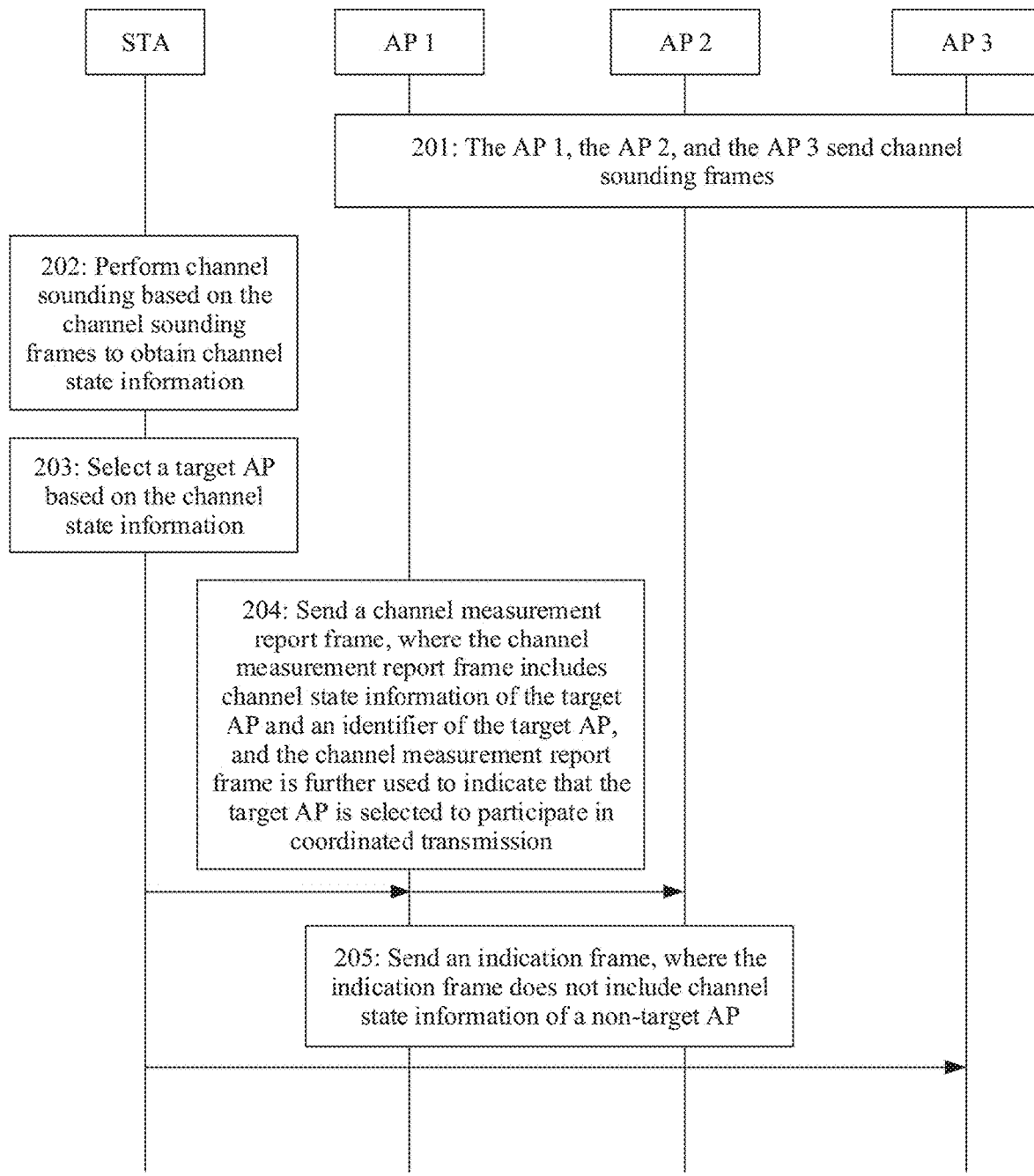
FIG. 8 is a schematic flowchart of a channel sounding method according to an embodiment of this application.

With reference to FIG. 3, FIG. 8 is a schematic flowchart of a channel sounding method according to an embodiment of this application. FIG. 8 includes the following operations.

Operation 201: n APs send channel sounding frames to a STA.

Operation 202: The STA performs channel sounding on channels of the n APs to obtain channel state information.

Operation 203: The STA selects m target APs from the n APs based on the channel state information.

Operation 204: The STA sends a channel measurement report frame, where the channel measurement report frame includes channel state information of the m target APs in the n APs and identifiers of the m target APs, and the channel measurement report frame is further used to indicate that the m target APs are selected to participate in coordinated transmission.

Operation 205: The STA sends an indication frame, where the indication frame does not include channel state information of (n−m) non-target APs.

The STA may use the channel measurement report frame to indicate that the m target APs are selected to participate in coordinated transmission. For a manner of sending the channel measurement report frame by the STA, refer to operation 104. Details are not described herein again. Further, the STA may further send the indication frame, and the indication frame is used to indicate that the (n−m) non-target APs are not selected to participate in coordinated transmission. For example, refer to FIG. 3. In an embodiment, the STA sends a channel measurement report frame including identification information and channel state information of the AP 1 and the AP 2, and the STA sends an indication frame, where the indication frame does not include channel state information of a non-target AP (the AP 3).

In an embodiment, the indication frame may be a frame that has a simple frame structure and that includes only a destination address, a transmitting address, and a feedback type field. For example, the structure of the indication frame may be shown in FIG. 9. In this way, channel overheads are further reduced. For example, the STA sends the indication frame to the AP 3. The AP 3 receives the indication frame, identifies that the indication frame does not include channel state information, and therefore, determines that the AP 3 is not selected to participate in coordinated transmission.

In an embodiment, the indication frame and the channel measurement report frame may have a same frame structure. For example, the indication frame and the channel measurement report frame both are beamforming report frames. Different from that in a channel measurement report frame of the target AP, a channel measurement report field in a channel measurement report frame of the non-target AP does not include channel state information. For example, the STA sends channel measurement report frames. Channel measurement report frames sent to the AP 1 and the AP 2 include channel state information, and a channel measurement report frame sent to the AP 3 does not carry channel state information. Therefore, after identifying that the channel measurement report frame does not carry the channel state information of the AP 3, the AP 3 determines that the AP 3 is not selected to participate in coordinated transmission.

In an embodiment, information carried in the indication frame and information carried in the channel measurement report frame may be combined into one beamforming report frame for sending.

In an example, an example in which the indication frame is a separate beamforming report frame is described in detail.

In an embodiment, a beamforming report frame sent by the STA to the non-target AP includes a MIMO control field, and does not include a beamforming report field used to carry channel state information. In an embodiment, the beamforming report frame sent by the STA to the non-target AP may include the MIMO control field and the beamforming report field, where the beamforming report field is empty, so that an AP that receives this type of beamforming report frame including no channel state information determines that the AP is not selected to participate in coordinated transmission.

measurement report frame may alternatively be combined into one beamforming report frame for sending.

In an example, fields and meanings that may be included in the beamforming report frame may be shown in Table 2 or Table 3. It should be noted that for different feedback manners, beamforming report frames may not include all fields in Table 2 or Table 3 but adaptively include some of the fields.

TABLE 2

| Field name | Function description |
| --- | --- |
| Category | Used to identify a type of a beamforming report frame |
| Action indication field | Indicate to send a channel measurement report field, and an AP does not need to reply with a response frame |
| MIMO control field of the AP 1 | Include control information of the AP 1 |
| Beamforming report field of the AP 1 | Include channel state information of the AP 1 |
| Selection information field of the AP 1 | Include non-selection indication information and/or channel quality information |
| MIMO control field of the AP 2 | Include control information of the AP 2 |
| Beamforming report field of the AP 2 | Include channel state information of the AP 2 |
| Selection information field of the AP 2 | Include non-selection indication information and/or channel quality information of the AP 2 |
| MIMO control field of the AP 3 | Include control information of the AP 3 |
| Beamforming report field of the AP 3 | Include channel state information of the AP 3 |
| Selection information field of the AP 3 | Include non-selection indication information and/or channel quality information of the AP 3 |
| . . . | . . . |

TABLE 3

| Field name | Function description |
| --- | --- |
| Category | Used to identify a type of a beamforming report frame |
| Action indication field | Indicate to send a channel measurement report field, and an AP does not need to reply with a response frame |
| MIMO control fields of all APs | Include control information of all the APs |
| Beamforming report field of the AP 1 | Include channel state information of the AP 1 |
| Selection information field of the AP 1 | Include non-selection indication information and/or channel quality information |
| Beamforming report field of the AP 2 | Include channel state information of the AP 2 |
| Selection information field of the AP 2 | Include non-selection indication information and/or channel quality information of the AP 2 |
| Beamforming report field of the AP 3 | Include channel state information of the AP 3 |
| Selection information field of the AP 3 | Include non-selection indication information and/or channel quality information of the AP 3 |
| . . . | . . . |

To implement the foregoing feedback manner, the beamforming report frame used in this application may include the MIMO control field, the beamforming report field, and a selection information field. The MIMO control field may be used to carry control information of an AP. The control information includes but is not limited to bandwidth, a transmit antenna quantity, and a receive antenna quantity. In an embodiment, the MIMO control field may be, for example, shown in FIG. 2. The beamforming report field includes but is not limited to channel state information. The selection information field includes but is not limited to non-selection indication information and/or channel quality information (an SNR, an RSSI, and/or a channel correlation). The beamforming report frame may further include but is not limited to a category field used to identify a type of the beamforming report frame and an action indication field used to indicate to send the beamforming report frame. In addition, the AP does not need to reply with a response frame.

In another example, the information carried in the indication frame and the information carried in the channel A difference between Table 2 and Table 3 lies in that when the frame structure in Table 2 is used, a beamforming report frame includes one or more MIMO control fields, and each MIMO control field one-to-one corresponds to an AP, in other words, a MIMO control field includes control information of a corresponding AP; and when the frame structure in Table 3 is used, a beamforming report frame includes one MIMO control field carrying control information of all APs.

The following first provides detailed description with reference to the frame structure shown in Table 2. The frame structure in Table 3 is described in detail in the following embodiment. A structure of a beamforming report frame of a non-target AP (the AP 3) may be shown in FIG. 10. The beamforming report frame includes the MIMO control field of the AP 3 in Table 2 used to carry the control information of the AP 3. The AP 3 receives the beamforming report frame, and identifies that the beamforming report frame does not carry a beamforming report field, in other words, the beamforming report frame does not carry channel state information. Therefore, the AP 3 determines that the AP 3 is not selected to participate in coordinated transmission.

In an embodiment, still refer to FIG. 10. The beamforming report frame of the non-target AP (the AP 3) may alternatively include a MIMO control field and a beamforming report field, where the beamforming report field is empty, in other words, the beamforming report field does not include channel state information. Correspondingly, the AP 3 receives the beamforming report frame, identifies that the beamforming report field in the beamforming report frame does not include the channel state information, and therefore, determines that the AP 3 is not selected to participate in coordinated transmission. In an embodiment, the beamforming report frame further includes the category field, the action indication field, and the like in Table 2.

Figure 11:
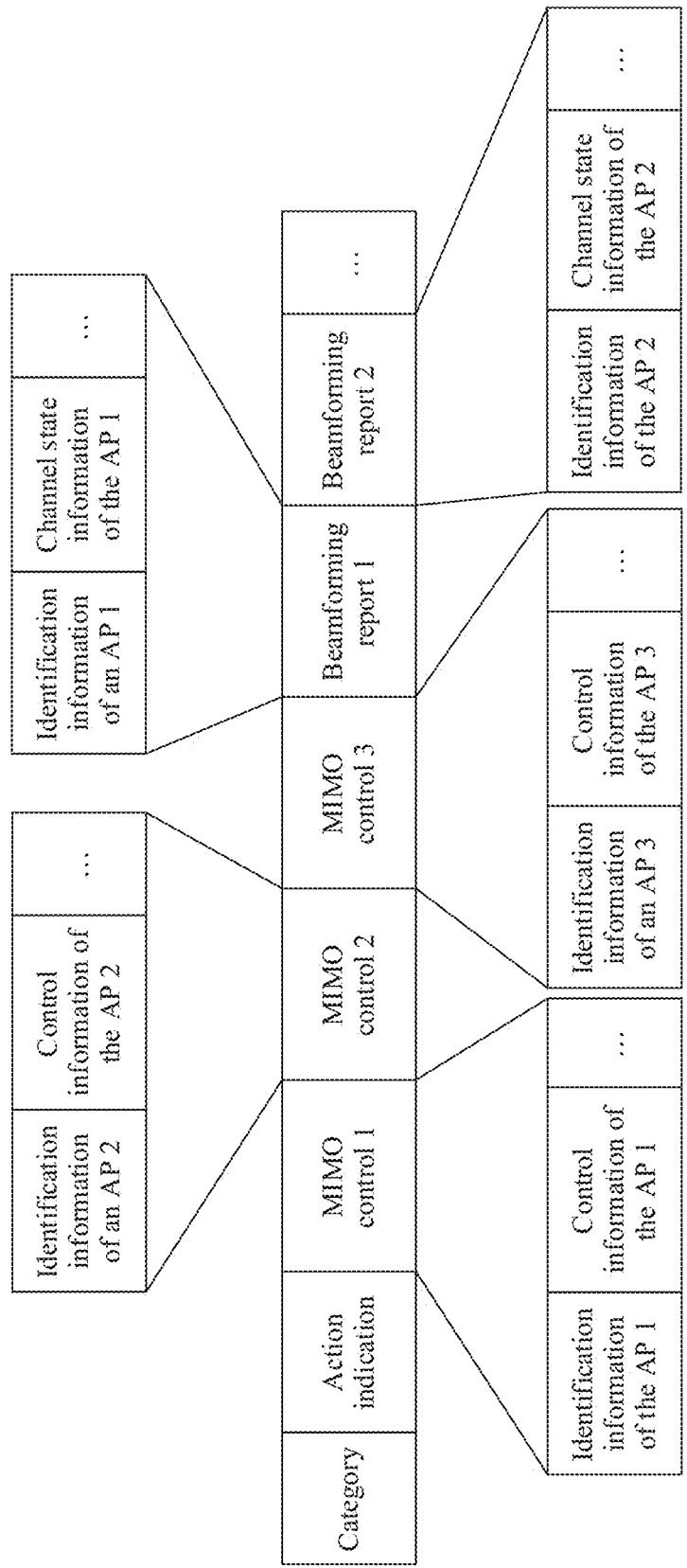
FIG. 11 is a schematic diagram of a frame structure of a beamforming report frame according to an embodiment of this application.

In an embodiment, with reference to Table 2, if a beamforming report frame is sent in a broadcast manner, a beamforming report frame sent by the STA may include a MIMO control field and a beamforming report field of the target AP and a MIMO control field of the non-target AP. For example, a frame structure of the beamforming report frame may be alternatively shown in FIG. 11. The beamforming report frame includes a MIMO control field (namely, a MIMO control field 1 in the figure) and a beamforming report field (namely, a beamforming report field 1 in the figure) of the AP 1; a MIMO control field (namely, a MIMO control field 2 in the figure) and a beamforming report field (namely, a beamforming report field 2 in the figure) of the AP 2; and a MIMO control field of the AP 3 (namely, a MIMO control field 3 in the figure). In an embodiment, identification information of an AP may be carried in a MIMO control field and a beamforming report field. For example, the AP 1, the AP 2, and the AP 3 may match their respective identification information to obtain their respective corresponding fields. The AP 1 and the AP 2 may identify and obtain information in the MIMO control fields and the beamforming report fields. The AP 3 does not identify a beamforming report field of the AP 3, in other words, the AP 3 does not obtain channel state information, and therefore, the AP 3 may determine that the AP 3 is not selected and the AP 3 may obtain control information in the MIMO control field.

Figure 12:
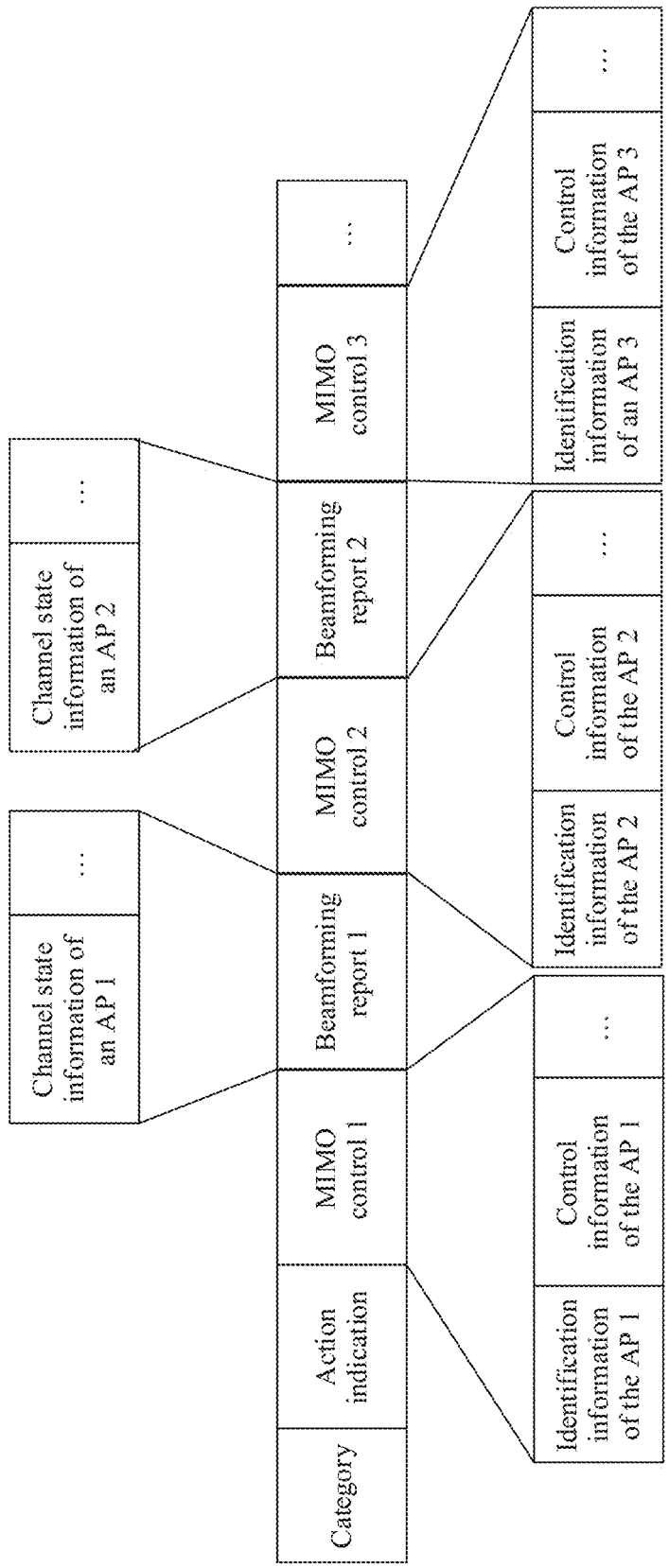
FIG. 12 is a schematic diagram of a frame structure of a beamforming report frame according to an embodiment of this application.

In an embodiment, the identification information of the AP may be alternatively carried in a MIMO control field and not carried in a beamforming report field. The AP may match identification information in the MIMO control field to obtain the corresponding MIMO control field, and determine a subsequent field adjacent to the MIMO control field as a beamforming report field of the AP, or any fields before a next field that is read by the AP and that includes identification information of another AP may be fields of the AP. For example, as shown in FIG. 12, a MIMO control field 1 includes identification information of the AP 1, and the AP 1 may determine, based on the identification information, that the MIMO control field 1 corresponds to the AP 1, obtain control information in the MIMO control field 1, and continue to read a subsequent beamforming report field.

In an embodiment, identification information of APs (including the target AP and the non-target AP) may be alternatively carried in another frame that is sent before the channel measurement report frame, where the another frame is used to indicate corresponding APs to obtain their respective fields in the channel measurement report frame based on an order in the identification information of the APs. In an embodiment, the identification information of the APs may be carried in an NDPA frame or a channel measurement report trigger frame.

In an embodiment, the beamforming report frame may alternatively include a MIMO control field and a beamforming report field of the target AP and a MIMO control field and a beamforming report field of the non-target AP, where the beamforming report field of the non-target AP is empty.

It should be noted that locations of the fields in the frame structure described in this application are merely examples, and may be set based on an actual requirement. This is not limited in this application.

Figure 13:
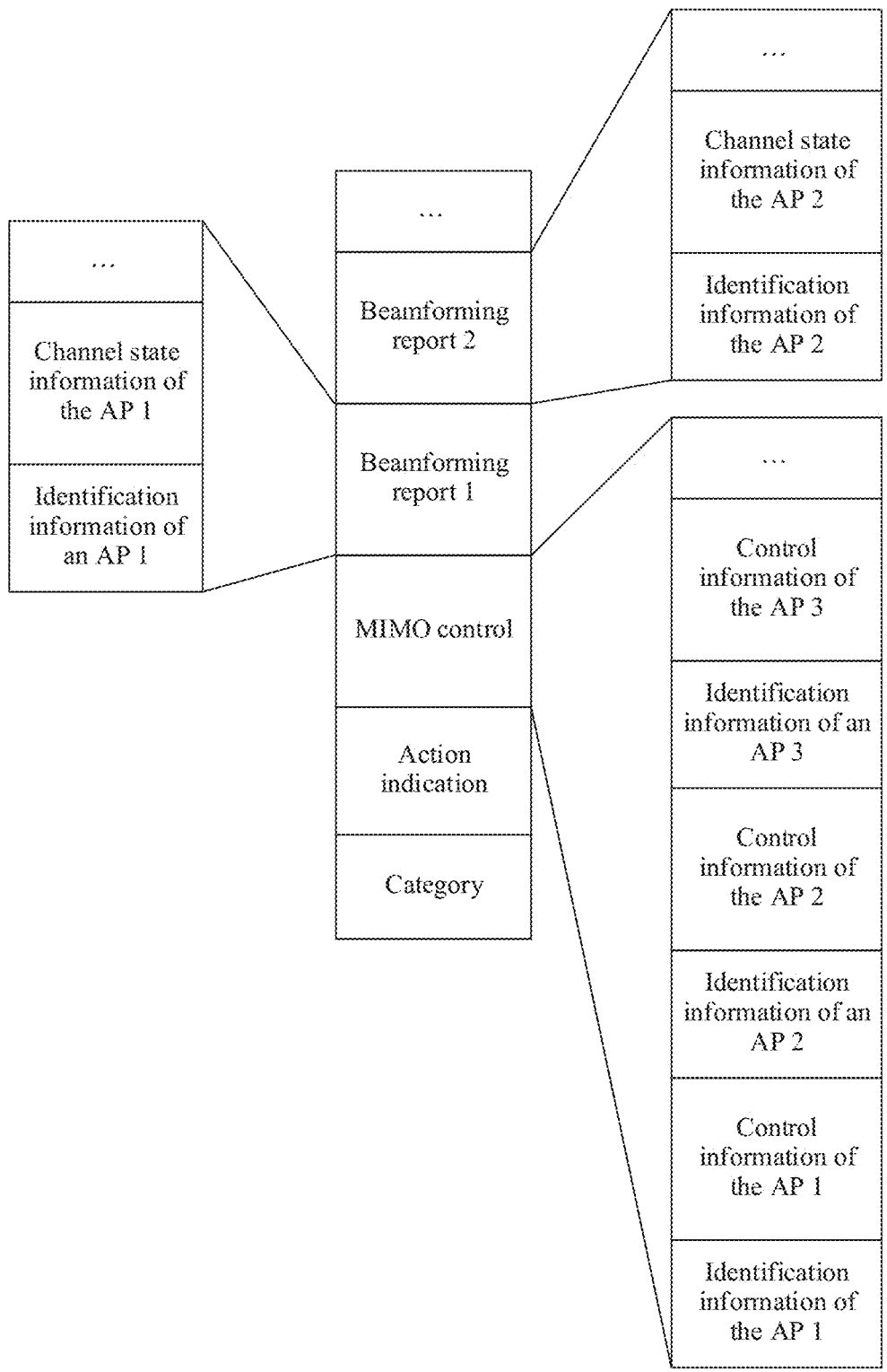
FIG. 13 is a schematic diagram of a frame structure of a beamforming report frame according to an embodiment of this application.

In an embodiment, with reference to Table 3, the APs (the AP 1, the AP 2, and the AP 3) may alternatively share one MIMO control field. In other words, control information of the AP 1, the AP 2, and the AP 3 may be carried in the MIMO control field. In an embodiment, the identification information of the AP may be carried in a MIMO control field corresponding to the control information. Correspondingly, the AP may determine, by identifying the identification information, that a field following the identification information (a field before next identification information) is control information of the AP. For example, for a frame structure of a beamforming report frame, refer to FIG. 13. The beamforming report frame includes MIMO control fields of the APs, a beamforming report field of the AP 1 (namely, a beamforming report field 1 in the figure), and a beamforming report field of the AP 2 (namely, a beamforming report field 2 in the figure). Correspondingly, the AP 1, the AP 2, and the AP 3 may read the MIMO control fields to obtain their respective control information. The AP 3 does not identify a corresponding beamforming report field, in other words, the AP 3 does not obtain corresponding channel state information, and therefore, the AP 3 determines that the AP 3 is not selected. In an embodiment, the identification information of the APs may be alternatively carried in another frame that is sent before the channel measurement report frame, and the APs may obtain their respective fields in the channel measurement report frame based on an order indicated in the identification information of the APs.

Figure 14:
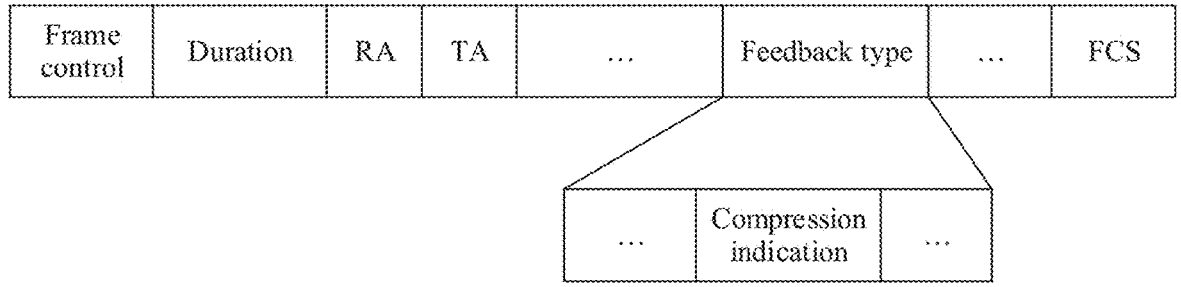
FIG. 14 is a schematic diagram of a frame structure of an NDPA frame according to an embodiment of this application.

In an embodiment, in this application, the STA may further compress the channel measurement report frame (for example, a beamforming report frame), to further reduce channel overheads. In an embodiment, the STA compresses the beamforming report by using a general or proprietary algorithm. General algorithms include but are not limited to a moving picture experts group (MPEG)-2 algorithm, an MPEG-4 algorithm, an H.264 algorithm, a request for comments (RFC) 1951 algorithm, and an RFC 1952 algorithm. For a specific compression manner, refer to the conventional technology. This is not limited in this application. Correspondingly, in this application, the STA may send a compression indication field, and the compression indication field is used to indicate that the beamforming report field is compressed. In an embodiment, the compression indication field may be included in the beamforming report frame. The AP may decompress the compressed beamforming report field based on an indication of the compression indication field, to obtain the beamforming report frame. In an embodiment, an NDPA frame sent by the AP may include a compression indication, used to notify another AP that the beamforming report is compressed, and used to indicate the STA to compress the beamforming report. In an embodiment, the compression indication may be carried in a feedback type field in the NDPA frame. For a frame structure of the NDPA frame, refer to FIG. 14. In an embodiment, the compression manner of the frame may be applied to point-to-point transmission, for example, signaling interaction between STAs.

It should be noted that operation 204 and operation 205 may be performed simultaneously or in order, and an execution order is not limited. In an embodiment, the STA may first perform operation 204 of sending a channel measurement report frame to target APs and then perform operation 205 of sending an indication frame to non-target APs. Alternatively, the STA may first perform operation 205 and then perform operation 204. Alternatively, the STA may perform operation 204 and operation 205 simultaneously.

In conclusion, in the technical solution in this embodiment of this application, the STA may send the channel measurement report frame to notify the target APs that the target APs are selected to participate in coordinated transmission. The STA does not send the channel state information of the unselected non-target APs, to notify the non-target APs that the non-target APs are not selected to participate in coordinated transmission. The STA may alternatively send an indication frame that does not carry the channel state information to the non-target APs, to notify the non-target APs that the non-target APs are not selected to participate in coordinated transmission, thereby providing a channel sounding manner of selecting a collaborating AP by the STA. In addition, the STA may selectively feed back channel state information, to effectively reduce channel overheads, improve resource utilization, and implement selection of the collaborating AP.

Scenario 2

Figure 15:
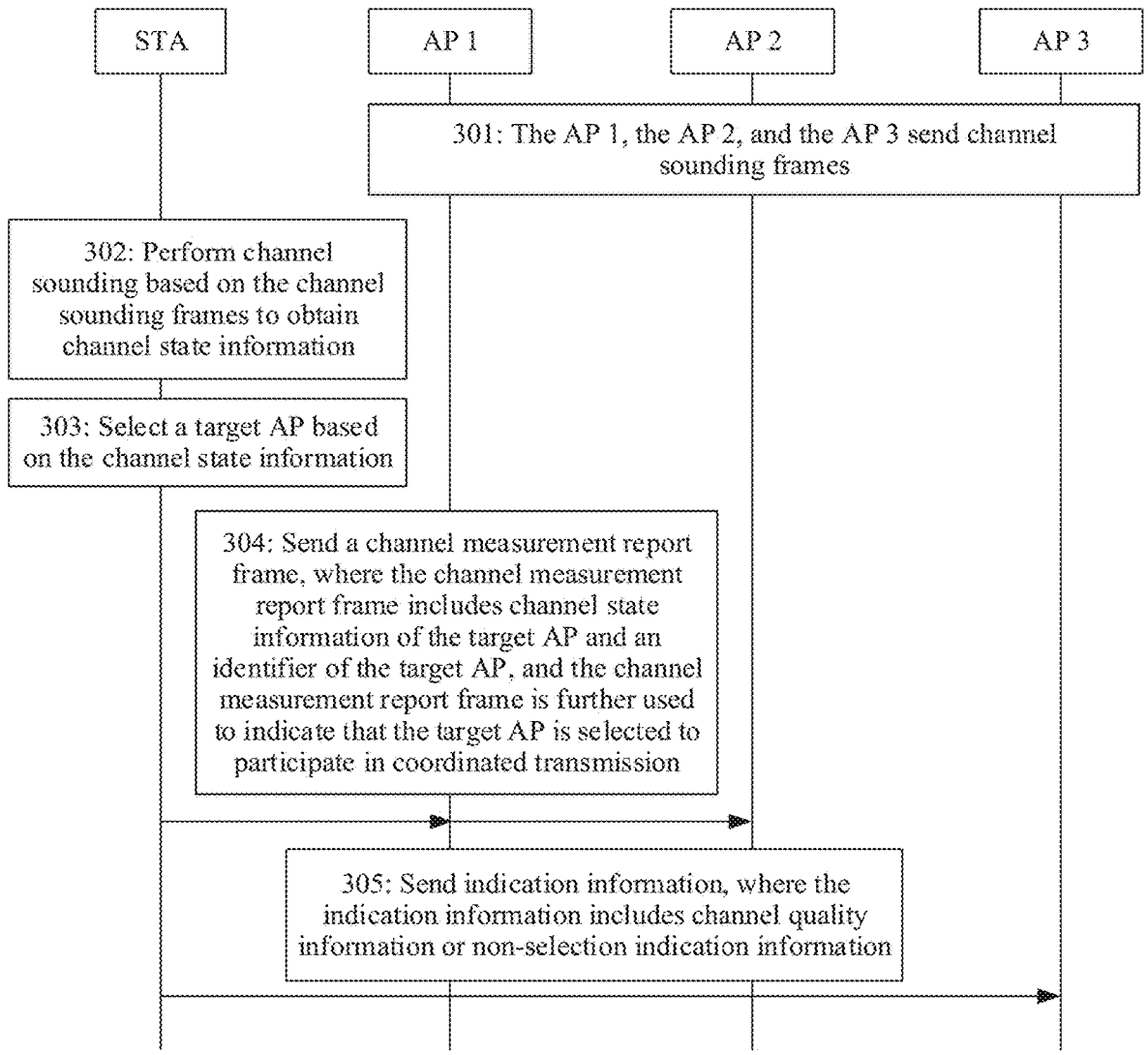
FIG. 15 is a schematic flowchart of a channel sounding method according to an embodiment of this application.

With reference to FIG. 3, FIG. 15 is a schematic flowchart of a channel sounding method according to an embodiment of this application. FIG. 15 includes the following operations.

Operation 301: n APs send channel sounding frames to a STA.

Operation 302: The STA performs channel sounding on channels of the n APs to obtain channel state information.

Operation 303: The STA selects m target APs from the n APs based on the channel state information.

Operation 304: The STA sends a channel measurement report frame, where the channel measurement report frame includes channel state information of the m target APs in the n APs and identifiers of the m target APs, and the channel measurement report frame is further used to indicate that the m target APs are selected to participate in coordinated transmission.

Operation 305: The STA sends indication information, where the indication information includes channel quality information or non-selection indication information.

In this application, the STA may send the channel measurement report frame to indicate that the m target APs are selected to participate in coordinated transmission. For a manner of sending the channel measurement report frame by the STA, refer to operation 104. Details are not described herein again.

Further, the STA may further send the indication information, and the indication information is used to indicate that (n–m) non-target APs are not selected to participate in coordinated transmission. In an embodiment, the indication information may be carried in a beamforming report frame. Alternatively, In an embodiment, the indication information may be carried in an indication frame, and the indication frame has a simple frame structure including a transmitting address, a receiving address, and an indication field (the indication field carries the indication information).

For example, refer to FIG. 15. In an embodiment, the STA sends a channel measurement report frame including identification information and channel state information of the AP 1 and the AP 2, to indicate that the AP 1 and the AP 2 are selected as target APs for participating in coordinated transmission; and the STA sends indication information, where the indication information includes channel quality information or non-selection indication information of the AP 3 and is used to indicate that the AP 3 is not selected to participate in coordinated transmission.

In an embodiment, the indication information may include the channel quality information, so that when identifying that the indication information carries only the channel quality information but does not carry channel state information requested by the AP, the non-target AP may determine that the AP is not selected to participate in coordinated transmission. In addition, the channel quality information may further reflect that channel quality is good or bad. Correspondingly, the AP may determine quality of a channel between the AP and the STA based on the channel quality information. In an embodiment, the channel quality information may be an indicator, for example, an RSSI, an SNR, or a channel correlation. In an embodiment, a bit length occupied by the channel quality information is less than a bit length occupied by all channel state information required by the AP, thereby further reducing channel overheads.

In an embodiment, the indication information may further include the non-selection indication information, so that when identifying that the indication frame includes the non-selection indication information, the non-target AP may determine that the AP is not selected to participate in coordinated transmission. In an embodiment, a length of the indication information may be 1 bit, thereby further reducing channel overheads.

The following provides detailed description with reference to FIG. 3 by using an example in which the indication information is carried in the channel measurement report frame (or the beamforming report frame).

In an embodiment, in this application, the beamforming report frame may include two forms:

(1) A beamforming report frame may carry information of a plurality of APs.

(2) A beamforming report frame carries information of only one AP.

For the case (1), In an embodiment, the beamforming report frame may include the channel state information of the AP 1 and the AP 2 and the indication information of the AP 3, so that after identifying the channel state information, the AP 1 and the AP 2 determine that the AP 1 and the AP 2 are selected target APs; and after identifying the indication information, the AP 3 determines that the AP 3 is an unselected non-target AP.

Figure 16:
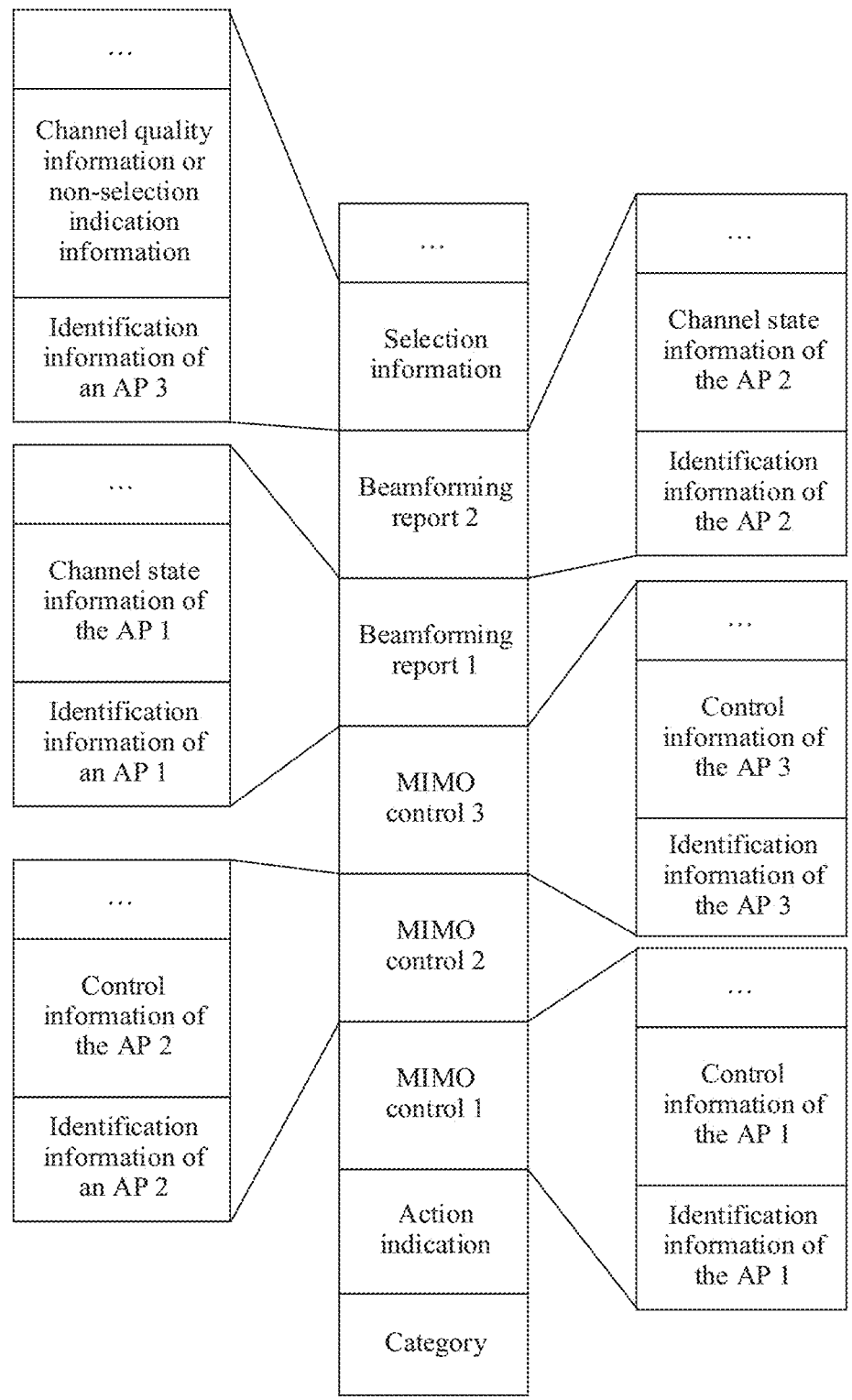
FIG. 16 is a schematic diagram of a frame structure of a beamforming report frame according to an embodiment of this application.
Figure 17:
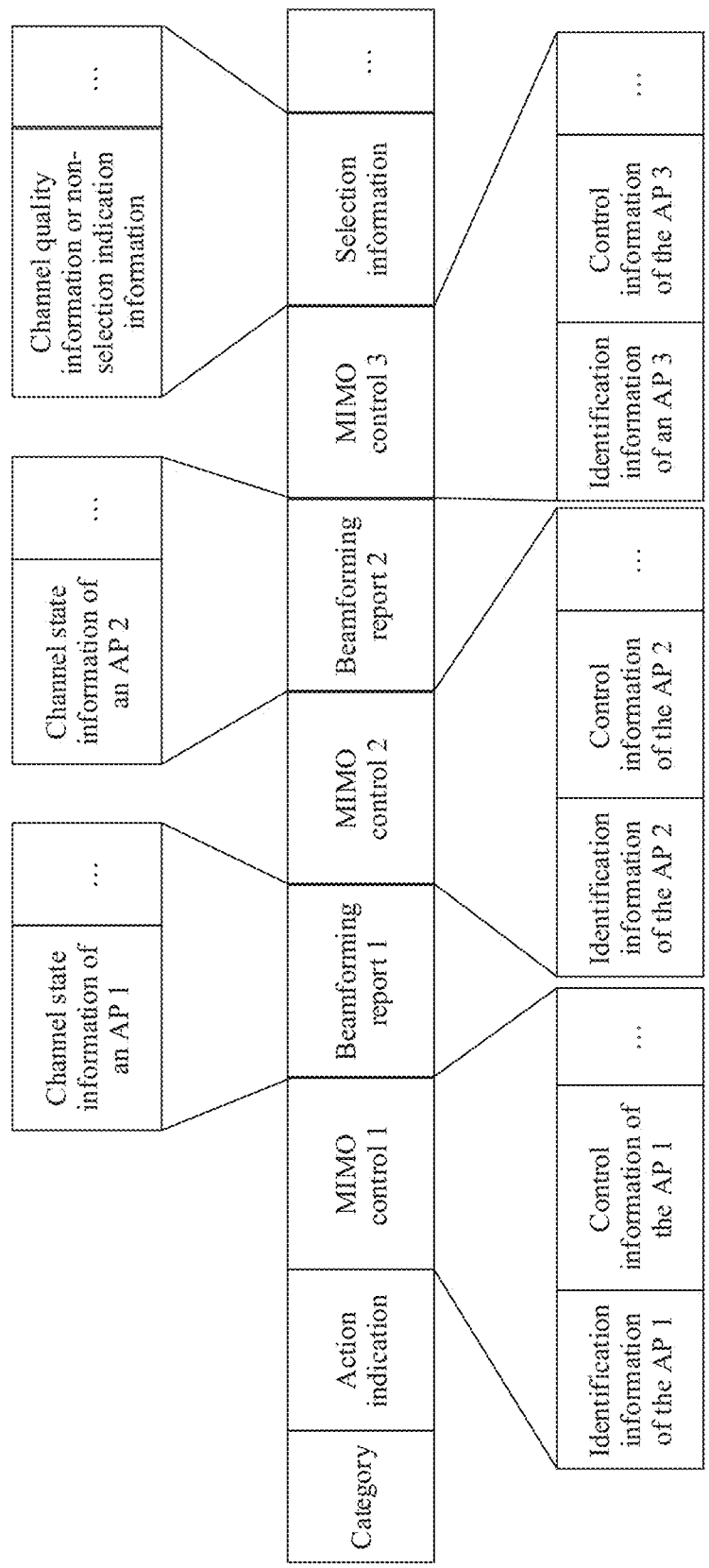
FIG. 17 is a schematic diagram of a frame structure of a beamforming report frame according to an embodiment of this application.

For example, the beamforming report frame includes a selection information field. In an embodiment, the indication information may be carried in the selection information field, so that after identifying the selection information field, the AP 3 determines that the AP 3 is not selected. For example, the beamforming report frame may be shown in FIG. 16. In FIG. 16, the beamforming report frame includes a selection information field, and the field may include identification information of the AP 3 and the indication information. After local identification information of the AP 3 matches the identification information in the selection information field, the AP 3 reads the indication information in the field. If the indication information is channel quality information, for example, an RSSI, the AP 3 may obtain a value of the RSSI. If the indication information is non-selection indication information, the AP 3 determines that the AP 3 is not selected. In addition, the beamforming report frame further includes a MIMO control field and a beamforming report field of the AP 1, a MIMO control field and a beamforming report field of the AP 2, a MIMO control field of the AP 3, and the like. In an embodiment, the beamforming report frame may be alternatively shown in FIG. 17. Identification information of an AP may be carried in a MIMO control field and not carried in a beamforming report field or a selection information field. A structure of the frame is similar to that in FIG. 12. For related description, refer to content of FIG. 12. Details are not described herein again.

For the case (2), channel measurement report frames of the APs may be independent of each other. For example, a channel measurement report frame of the AP 1 includes the identification information and the channel state information of the AP 1 and does not include information about other APs.

Figure 18:
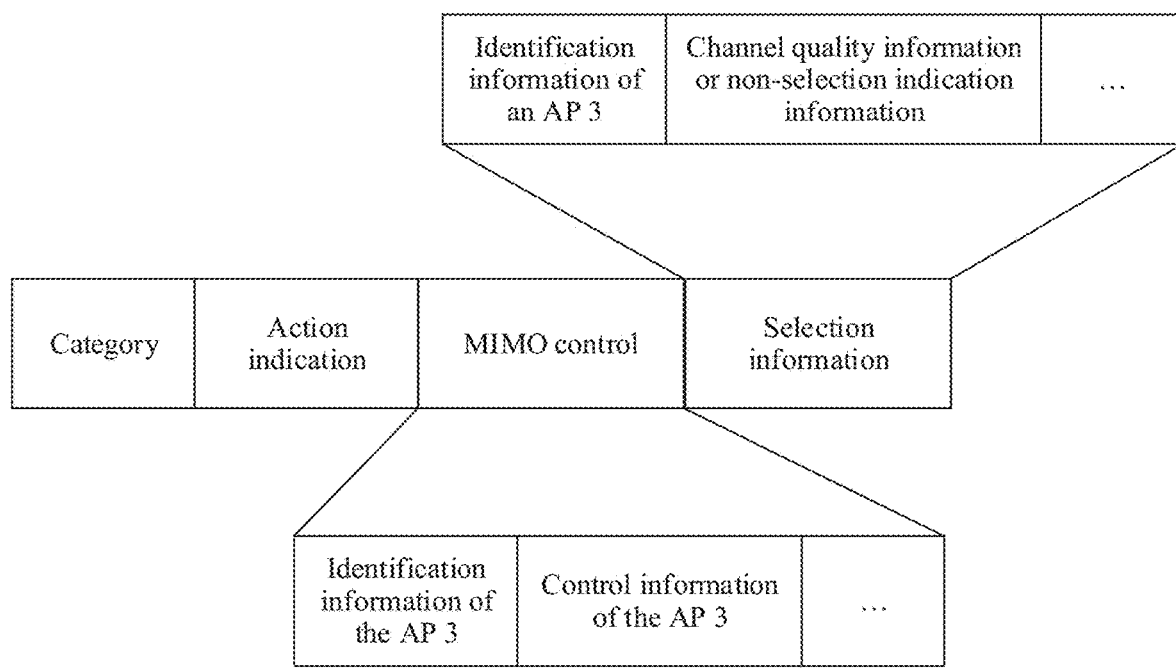
FIG. 18 is a schematic diagram of a frame structure of a beamforming report frame according to an embodiment of this application.

For example, a beamforming report of the AP 3 may include a selection information field. A function of the selection information field is described above, and details are not described herein again. A frame structure of the beamforming report frame may be shown in FIG. 18. Refer to FIG. 18. The field may further include another field, for example, a MIMO control field of the AP 3.

It should be noted that operation 304 and operation 305 may be performed simultaneously or in order, and an execution order is not limited.

Scenario 3

Figure 19:
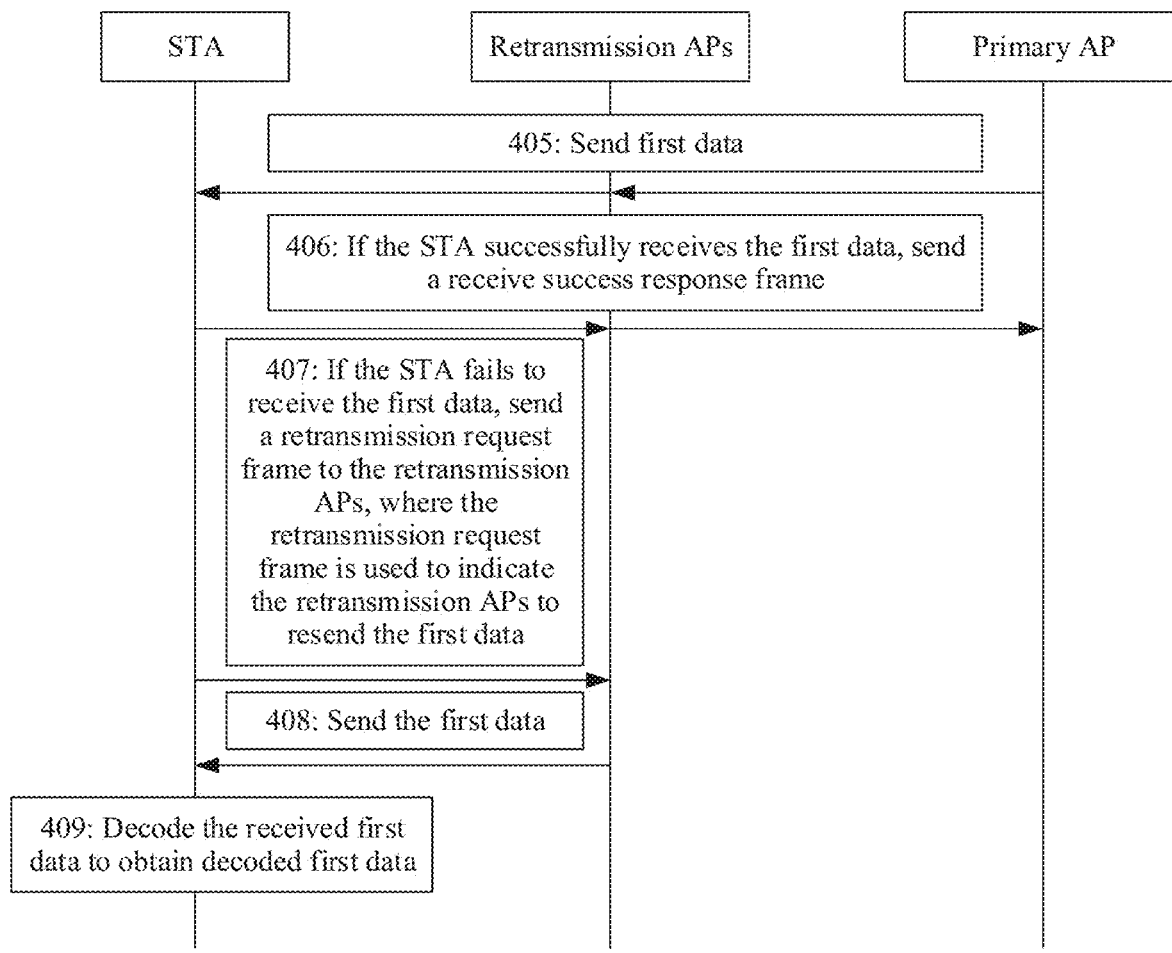
FIG. 19 is a schematic flowchart of a channel sounding method according to an embodiment of this application.

With reference to FIG. 3, FIG. 19 is a schematic flowchart of a channel sounding method according to an embodiment of this application. FIG. 19 includes the following operations.

For operation 401 to operation 404, refer to the operations in the scenario 1 or the scenario 2. Details are not described herein again.

Operation 405: The target AP and the STA receive first data sent by a primary AP.

In an embodiment, in this application, the primary AP may be one of the m target APs or may be not a target AP. For example, the primary AP may be the AP 1 in FIG. 3.

The primary AP shares the first data with the target AP, and the STA may also receive the first data shared by the primary AP. If the STA successfully receives the first data, operation 406 is performed. If the STA fails to receive the first data, operation 407 is performed.

In an embodiment, in operation 406, the STA sends a receive success response frame.

In this application, the STA may send the receive success response frame to the primary AP or the primary AP and another target AP, to notify the primary AP or the primary AP and the another target AP that the first data is successfully received. The primary AP or the primary AP and the another target AP may delete the buffered first data, thereby reducing device pressure.

Operation 407: The STA sends a retransmission request frame to p retransmission APs in the m target APs, where the retransmission request frame is used to indicate the p retransmission APs to resend the first data.

In this application, if the STA fails to receive the first data, the STA may select the p retransmission APs from the m target APs, and send the retransmission request frame to the p retransmission APs. The retransmission request frame is used to indicate the retransmission APs to retransmit the first data to the STA.

In an embodiment, in this application, the STA may select the primary AP (for example, the AP 1 in FIG. 3) as the retransmission AP. Correspondingly, the STA sends the retransmission request frame to the primary AP, to indicate the primary AP to retransmit the first data.

In an embodiment, in this application, the STA may select, as the retransmission AP, a target AP other than the primary AP or an AP that sends the first data the last time. In an embodiment, a quantity of retransmission APs may be greater than or equal to 1 and less than or equal to m.

In an embodiment, in this application, the STA may select the p retransmission APs according to a preset rule. In an embodiment, the preset rule may be, for example, a rule of selecting p APs with a best channel state from the m target APs. This is not limited in this application.

In an embodiment, in this application, the retransmission request frame includes but is not limited to a retransmission mode field, a retransmission AP information field, and/or a transmitting address indication field. The retransmission mode field may be used to indicate whether the retransmission AP uses joint transmission to retransmit the first data. In an embodiment, setting the retransmission mode field to 1 may indicate joint transmission, and setting the field to 0 may indicate non-joint transmission. In an embodiment, the retransmission request frame may further include the transmitting address indication field, to indicate address information carried in the first data sent by the retransmission AP. In an embodiment, the transmitting address indication field is address information of an AP that sends the first data the last time. In an embodiment, the address information may be MAC address information.

In an embodiment, the retransmission request frame may further include a destination address field (which may also be referred to as a receiving address (RA) field) and the retransmission AP information field. The destination address field is a broadcast address or address information of the retransmission AP. The retransmission AP information field may include identification information of the retransmission AP. In an embodiment, the identification information may be a MAC address, an AID, or the like of the retransmission AP.

In an embodiment, if the retransmission request frame is sent in a broadcast manner, when the retransmission AP information field includes identification information of a plurality of APs, the retransmission request frame may not include a retransmission mode field. An AP whose local identification information matches the identification information carried in the retransmission AP information field may be determined as a retransmission AP, and transmit the first data together with another retransmission AP.

In an embodiment, if the retransmission request frame is sent in a unicast manner, and the STA selects only one retransmission AP, the retransmission request frame may not include a retransmission AP information field and/or a retransmission mode field. An AP that receives the retransmission request frame may be determined as a retransmission AP, and may retransmit the first data through non-joint transmission. FIG. 20 is a schematic diagram of a frame structure of the retransmission request frame. Refer to FIG. 20. The retransmission request frame may further include a transmitting address (TA) field, a frame control field, a duration field, a frame check sequence (FCS), and the like.

Operation 408: The p retransmission APs send the first data.

In this application, the AP that receives the retransmission request frame resends the first data.

In an embodiment, if the AP that receives the retransmission request frame is the AP that sends the first data the last time, for example, the AP 1, and the retransmission request frame indicates that non-joint transmission is used, the primary AP resends the first data to the STA after receiving the retransmission request frame.

In an embodiment, if the AP that receives the retransmission request frame is not the AP that sends the first data the last time, for example, the AP 2, the AP 2 identifies whether the retransmission AP information field in the retransmission request frame includes indication information of a plurality of APs and/or a joint transmission indication. If the field includes the indication information and/or the joint transmission indication, the AP 2 and another retransmission AP retransmit the first data. If the field does not include the indication information and/or the joint transmission indication, the AP 2 retransmits the first data to the STA. In an embodiment, if the retransmission request frame received by the AP 2 further includes a transmitting address indication field, and the transmitting address indication field includes the address information of the AP that sends the first data the last time, the first data retransmitted by the AP 2 includes the address information of the AP that sends the first data the last time, for example, the address information of the AP 1.

Operation 409: The STA decodes the received first data to obtain decoded first data.

The STA receives the first data sent by the retransmission AP and decodes the first data, to obtain the decoded first data.

In an embodiment, if address information carried in the first data that is received by the STA this time is the same as address information carried in first data that is received the last time, the STA may perform joint software decoding on the first data received this time and the first data received the last time, to improve decoding accuracy. In an embodiment, the STA may perform joint software decoding on first data that is received for a plurality of times and that has same address information, in other words, each time after the STA fails to receive the first data, the STA indicates the retransmission AP to retransmit the first data, and content of transmitting address indication fields that are carried in retransmission request frames is the same, to indicate that first data retransmitted by the retransmission AP each time includes same address information.

Figure 21:
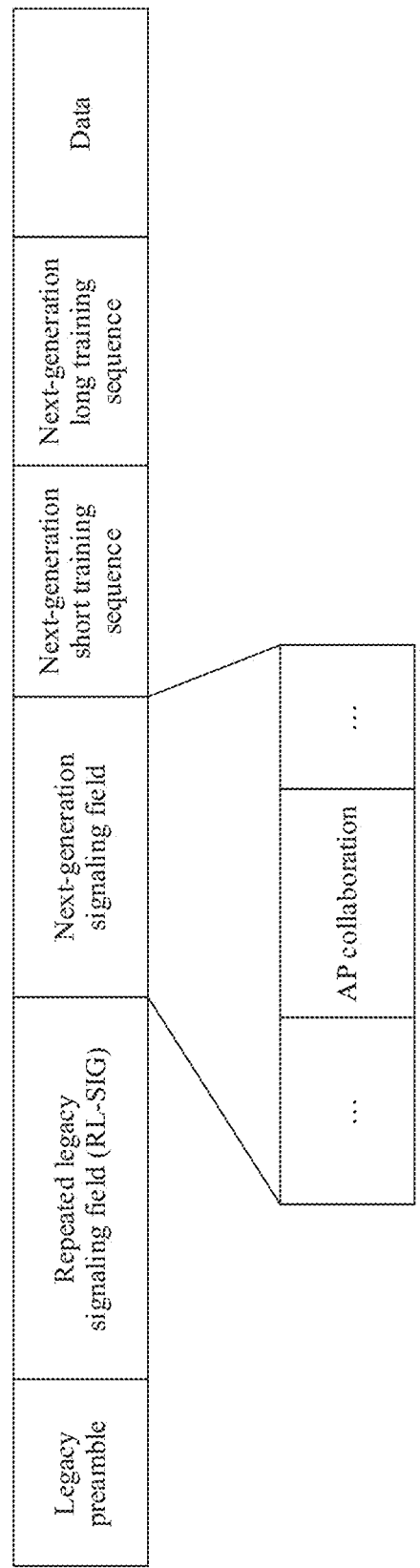
FIG. 21 is a schematic diagram of a frame structure of a physical preamble according to an embodiment of this application.

In an embodiment, in this application, to implement the foregoing coordinated transmission mode, the STA and/or the AP may send a dynamic AP selection indication, to indicate to use a manner of dynamically selecting a retransmission AP by the STA during data retransmission. In an embodiment, the dynamic AP selection indication may be carried in a physical preamble of a physical layer protocol data unit. In an embodiment, the physical preamble may be a physical preamble of an NDP sent by the AP, or may be a physical preamble of the first data. This is not limited in this application. A schematic diagram of a structure of a physical layer protocol data unit is shown in FIG. 21. A physical preamble may include at least one signaling field (SIG), and the signaling field may also be referred to as a next-generation signaling field. The signaling field may include an AP collaboration field. In an example, functions corresponding to values of the AP collaboration field may be shown in Table 4.

TABLE 4

| | |
|---|---|
| 0000 | Coordinated orthogonal frequency division multiple access (Coordinated Orthogonal Frequency Division Multiple Access (OFDMA)) |
| 0001 | Coordinated beamforming (Coordinated Beamforming) |
| 0010 | Coordinated scheduling/Enhanced spatial reuse (Coordinated Scheduling/Enhanced Spatial Reuse) |
| 0011 | Dynamic AP selection indication (Dynamic AP Selection) |
| 0111 | Joint transmission (Joint transmission) |
| . . . | . . . |

It should be noted that the value corresponding to each field in each table in this application may be set based on an actual requirement. This is not limited in this application.

Figure 22:
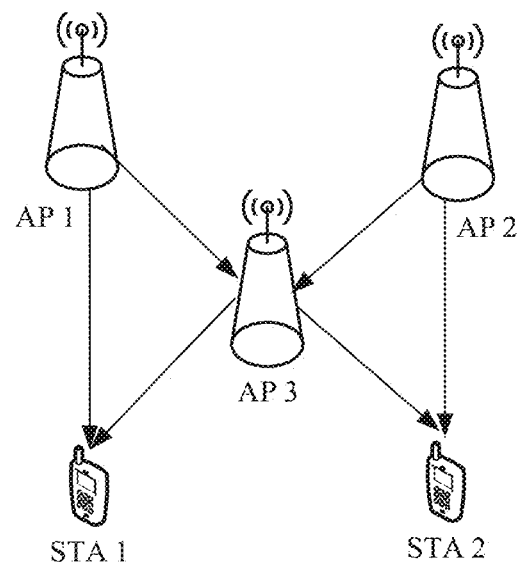
FIG. 22 is a schematic diagram of an application scenario according to an embodiment of this application.

In an embodiment, the coordinated transmission mode in the scenario 3 may be further applied to an application scenario shown in FIG. 22. Certainly, the coordinated transmission mode in the scenario 3 may be further applied to another scenario. FIG. 22 is only an example. In FIG. 22, an AP 1 and an AP 3 perform coordinated transmission with a STA 1, and an AP 2 and the AP 3 perform coordinated transmission with a STA 2. When sending second data to the STA 1, the AP 1 shares the second data with the AP 3. When sending third data to the STA 2, the AP 2 shares the third data with the AP 3.

In an embodiment, similar to that in the scenario 3, if the STA 1 fails to receive the second data sent by the AP 1, the STA 1 may select the AP 1, or the AP 3, or the AP 1 and the AP 3 as a retransmission AP, and send a retransmission request to the retransmission AP, to indicate the retransmission AP to retransmit the second data. For a retransmission manner, refer to the scenario 3. Details are not described herein again. Similarly, the STA 2 may select the AP 2, or the AP 3, or the AP 2 and the AP 3 as a retransmission AP. For details, refer to the scenario 3. Details are not described herein again.

In an embodiment, in a coordinated transmission architecture shown in FIG. 22, the AP 1 and the AP 2 may send data at a same moment or at different moments. In an embodiment, if the AP 1 and the AP 2 send the data at the different moments, the AP 3 may separately buffer the second data and the third data; and if the AP 3 is selected by the STA 1 as a retransmission AP, the AP 3 resends the second data to the STA 1. If the AP 3 is selected by the STA 2 as a retransmission AP, the AP 3 resends the third data to the STA 2.

In an embodiment, if the AP 1 and the AP 2 send the data at the same moment, the AP 3 may separately buffer the second data and the third data, or the AP 3 may alternatively combine the second data and the third data. In other words, if the AP 3 is selected by the STA 1 as a retransmission AP, data resent by the AP 3 to the STA 1 is combined data. It should be noted that, for the combined data, the STA 1 and/or the STA 2 need to decode the combined data in an exclusive OR manner, to obtain the second data or the third data.

The foregoing mainly describes the solutions provided in the embodiments of the present invention from a perspective of interaction between network elements. It can be understood that, to implement the foregoing functions, the STA and the AP include corresponding hardware structures and/or software modules for performing the functions. A person skilled in the art should be easily aware that units, algorithms, and operations in the examples described with reference to the embodiments disclosed in this specification can be implemented by hardware or a combination of hardware and computer software in the embodiments of the present invention. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of the present invention, the AP and the STA may be divided into functional modules based on the foregoing method examples. For example, each functional module may be obtained through division based on each corresponding function, or two or more functions may be integrated into one processing module. The integrated module may be implemented in a form of hardware, or may be implemented in a form of a software functional module. It should be noted that, in the embodiments of the present invention, division into the modules is an example, and is merely logical function division. In actual implementation, another division manner may be used.

Figure 23:
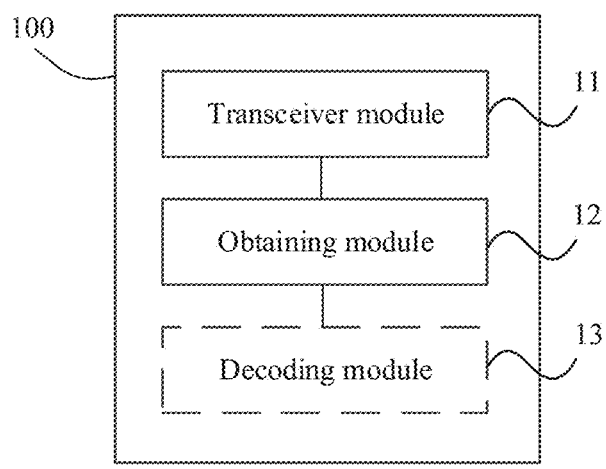
FIG. 23 is a schematic block diagram of an apparatus on a STA side according to an embodiment of this application.

When each functional module is obtained through division based on each corresponding function, FIG. 23 is a possible schematic diagram of a structure of a communication apparatus 100 on a STA side in the foregoing embodiments. As shown in FIG. 23, the apparatus 100 may include a transceiver module 11 and an obtaining module 12. The transceiver module 11 may be configured to support the STA to "receive channel sounding frames sent by n APs", for example, may support the STA to perform operation 102, operation 202, operation 302, and operation 402 in the foregoing embodiments. Alternatively, the transceiver module 11 may be configured to support the STA to perform the operation of "sending a channel measurement report frame", for example, may support the STA to perform operation 104, operation 204, operation 304, and operation 404 in the foregoing embodiments. Alternatively, the transceiver module 11 may be configured to support the STA to perform the operation of "sending an indication frame", for example, may support the STA to perform operation 205, operation 305, and operation 405 in the foregoing embodiments. Alternatively, the transceiver module 11 may be configured to support the STA to perform the operation of "sending or receiving a feedback type indication". Alternatively, the transceiver module 11 may be configured to support the STA to perform the operation of "receiving first data sent by a primary AP", for example, may support the STA to perform operation 405 in the foregoing embodiment. Alternatively, the transceiver module 11 may be configured to support the STA to perform the operation of "sending a retransmission request frame to p retransmission APs in m target APs if the first data fails to be received", for example, may support the STA to perform operation 407 in the foregoing embodiment. Alternatively, the transceiver module 11 may be configured to support the STA to perform the operation of "receiving first data retransmitted by a retransmission AP", for example, may support the STA to perform operation 409 in the foregoing embodiment. The obtaining module 21 may be configured to support the STA to perform the operation of "performing channel sounding based on channel sounding frames to obtain channel state information of each AP", for example, may support the STA to perform operation 102, operation 202, operation 302, and operation 402 in the foregoing embodiments.

In an embodiment, as shown in FIG. 23, the apparatus 100 may further include a decoding module 13. The decoding module 13 may be configured to support the STA to perform the operation of "performing joint software decoding based on the first data retransmitted by the retransmission AP and the first data sent by the primary AP, to obtain decoded first data", for example, may support the STA to perform operation 408 in the foregoing embodiment.

All related content of the operations in the foregoing method embodiments may be cited in function descriptions of the corresponding functional modules. Details are not described herein again.

Figure 24:
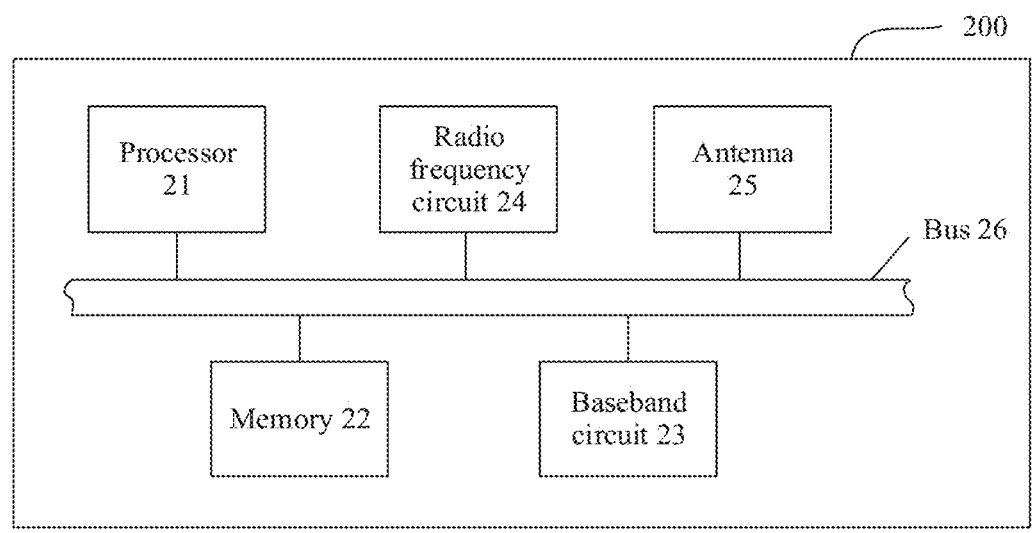
FIG. 24 is another schematic block diagram of an apparatus on a STA side according to an embodiment of this application.

In another example, FIG. 24 is a schematic block diagram of another communication apparatus 200 on a STA side according to an embodiment of this application. The apparatus 200 in this embodiment of this application may be the STA in the foregoing method embodiments, and the apparatus 200 may be configured to perform some or all functions of the STA in the foregoing method embodiments. The apparatus 200 may include a processor 21, a baseband circuit 23, a radio frequency circuit 24, and an antenna 25. In an embodiment, the apparatus 200 may further include a memory 22. Components of the apparatus 200 are coupled together through a bus 26. In addition to a data bus, the bus 26 further includes a power bus, a control bus, and a state signal bus. However, for clear description, various types of buses in the figure are marked as the bus system 26 in the figure.

The processor 21 may be configured to control the STA, and perform processing that is performed by the STA in the foregoing embodiments. The processor 21 may perform processing processes related to the STA in the foregoing method embodiments and/or may be used for other processes of the technology described in this application, and may further run an operating system, manage the bus, and execute a program or instructions stored in the memory.

The baseband circuit 23, the radio frequency circuit 24, and the antenna 25 may be configured to support the STA to send/receive information to/from the AP or the station in the foregoing embodiments, to support the STA to perform wireless communication with another node. In an example, signaling or data generated after being encoded by the baseband circuit 23 and encapsulated according to a protocol is processed by the radio frequency circuit, for example, undergoes analog conversion, filtering, amplification, and up-conversion, and then sent to the AP through the antenna 25. In still another example, a channel sounding frame sent by the AP is received through the antenna 25; the radio frequency circuit 24 performs processing such as filtering, amplification, down-conversion, and digitization on the channel sounding frame; then, the baseband circuit 23 performs baseband processing such as decoding and protocol-based decapsulation on a processed channel sounding frame; and the processor 21 performs processing on a processed channel sounding frame to recover service data and signaling information sent by the station. It can be understood that the baseband circuit 23, the radio frequency circuit 24, and the antenna 25 may be further configured to support the STA to communicate with another network entity, for example, support the STA to communicate with a network element on a core network side.

The memory 22 may be configured to store program code and data of the STA. A person skilled in the art can easily understand that the memory 22 or any part of the memory 22 may be located outside the apparatus 200. For example, the memory 22 may include a transmission line and/or a computer product that is separated from a wireless node. All these media can be accessed by the processor 21 through the bus interface 26. Alternatively, the memory 22 or any part thereof may be integrated into the processor 21. For example, the memory 22 or any part thereof may be a high-speed cache and/or a general-purpose register.

It can be understood that FIG. 24 shows only a simplified design of the STA. For example, in actual application, the STA may include any quantity of transmitters, receivers, processors, memories, and the like, and all STAs that can implement the present invention fall within the protection scope of the present invention.

Figure 25:
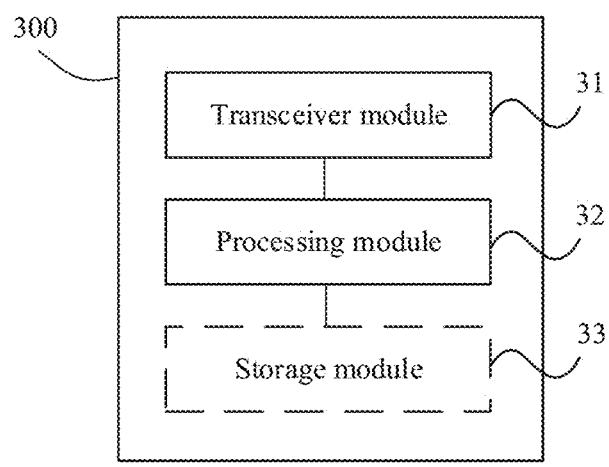
FIG. 25 is a schematic block diagram of an apparatus on an AP side according to an embodiment of this application.

FIG. 25 is a schematic block diagram of an apparatus 300 on an access point side according to an embodiment of this application. In an embodiment, the apparatus 300 shown in FIG. 25 may correspond to the apparatus on the AP side in the foregoing method embodiments, and may have any function of the AP in the methods. In an embodiment, the apparatus 300 in this embodiment of this application may be an AP or a chip in an AP. The apparatus 300 may include a transceiver module 31 and a processing module 32. In an embodiment, the apparatus 300 may further include a storage module 33. The storage module 33 may be configured to buffer some or all of first data.

It can be understood that the transceiver module 31 may include a receiving module and a sending module. The receiving module may be configured to receive signaling or data that is sent by the STA in operation 104, operation 204, operation 304, operation 404, operation 405, and operation 406 in the foregoing method embodiments. The sending module may be configured to send the signaling or data in operation 101, operation 201, operation 301, operation 401, operation 405, and operation 408 in the foregoing embodiments.

The processing module 32 may be configured to perform related operations in the foregoing method embodiments of determining, based on feedback information of channel state information, whether an AP is selected by a STA to participate in coordinated transmission.

It should be understood that the apparatus 300 according to this embodiment of this application may correspond to the AP in the methods of the foregoing embodiments, and the foregoing and other management operations and/or functions of the modules in the apparatus 300 are intended to implement corresponding operations in the foregoing methods. For brevity, details are not described herein again.

Figure 26:
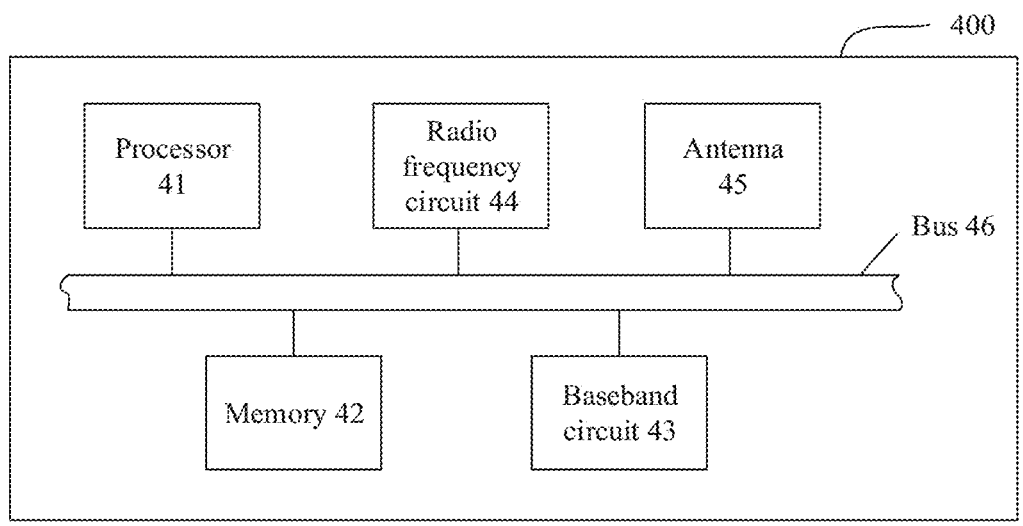
FIG. 26 is another schematic block diagram of an apparatus on an AP side according to an embodiment of this application.

In another example, FIG. 26 is a schematic block diagram of another communication apparatus 400 on an AP side according to an embodiment of this application. The apparatus 400 in this embodiment of this application may be the AP in the foregoing method embodiments, and the apparatus 400 may be configured to perform some or all functions of the AP in the foregoing method embodiments. The apparatus 400 may include a processor 41, a baseband circuit 43, a radio frequency circuit 44, and an antenna 45. In an embodiment, the apparatus 400 may further include a memory 42. Components of the apparatus 400 are coupled together through a bus 46. In addition to a data bus, the bus system 46 further includes a power bus, a control bus, and a state signal bus. However, for clear description, various types of buses in the figure are marked as the bus system 46.

The processor 41 may be configured to: control the AP, and perform processing that is performed by the AP in the foregoing embodiments. The processor 41 may perform processing processes related to the AP in the foregoing method embodiments and/or may be used for other processes of the technology described in this application, and may further run an operating system, manage the bus, and execute a program or instructions stored in the memory.

The baseband circuit 43, the radio frequency circuit 44, and the antenna 45 may be configured to support the AP to send/receive information to/from the STA or the AP in the foregoing embodiments, to support the AP to perform wireless communication with another node. In an example, signaling or data sent by the STA, for example, a channel measurement report frame, is received through the antenna 45; then, the radio frequency circuit 44 performs processing such as filtering, amplification, down-conversion, and digitization on the signaling or data; then, the baseband circuit 43 performs baseband processing such as decoding and protocol-based decapsulation on processed signaling or data; and the processor 41 processes processed signaling or data to recover service data and signaling information sent by the station. In still another example, a coordination response message sent by the AP may be processed by the processor 41; the baseband circuit 43 performs baseband processing such as protocol-based encapsulation and encoding on a processed coordination response message; then, the radio frequency circuit 44 performs radio frequency processing such as analog conversion, filtering, amplification, and up-conversion on a processed coordination response message; and then a processed coordination response message is sent to the STA through the antenna 45. It can be understood that the baseband circuit 43, the radio frequency circuit 44, and the antenna 45 may be further configured to support the AP to communicate with another network entity, for example, support the AP to communicate with a network element on a core network side.

The memory 42 may be configured to store program code and data of an AP, and the memory 42 may be the storage module 33 in FIG. 25. In FIG. 26, the memory 42 is shown as separated from the processor 41. However, a person skilled in the art can easily understand that the memory 42 or any part thereof may be located outside the apparatus 400. For example, the memory 42 may include a transmission line and/or a computer product that is separated from a wireless node. All these media can be accessed by the processor 41 through the bus interface 46. Alternatively, the memory 42 or any part thereof may be integrated into the processor 41. For example, the memory 42 or any part thereof may be a high-speed cache and/or a general-purpose register.

It can be understood that FIG. 26 shows only a simplified design of the AP. For example, in actual application, the AP may include any quantity of transmitters, receivers, processors, memories, and the like, and all APs that can implement the present invention fall within the protection scope of the present invention.

An embodiment of this application further provides a computer-readable storage medium. The computer-readable storage medium stores instructions, and the instructions may be executed by one or more processors of a processing circuit. When the instructions are run on a computer, the computer is enabled to perform the methods in the foregoing aspects. In an embodiment, the computer storage medium is a non-volatile readable storage medium.

An embodiment of this application further provides a chip system. The chip system includes a processor, configured to support a STA or an AP to implement functions in the foregoing embodiments such as generating or processing data and/or information in the foregoing methods.

In a possible design, the chip system may further include a memory, and the memory is configured to store program instructions and data that are necessary for the STA or the AP. The chip system may include a chip, or may include a chip and another discrete component. The processor is configured to execute the program instructions, so that a communication apparatus on which the chip system is installed implements the method and the functions of the AP or the STA in any one of the foregoing embodiments. In an embodiment, the memory may be located outside the processor and is an external storage medium, or may be located inside the processor and is an internal storage medium of the processor.

An embodiment of this application further provides a processor, configured to be coupled to a memory. The processor is configured to perform the method and the functions of the STA in any one of the foregoing embodiments.

An embodiment of this application further provides a processor, configured to be coupled to a memory. The processor is configured to perform the method and the functions of the AP in any one of the foregoing embodiments.

An embodiment of this application further provides a chip, including a processing circuit and an input/output circuit. The input/output circuit is configured to input signaling or data to the processing circuit, and is further configured to output signaling or data generated by the processing circuit. The processing circuit is configured to process signaling or data, so that a communication apparatus on which the chip is installed can implement the method and the functions of the STA in any one of the foregoing embodiments.

An embodiment of this application further provides a chip, including a processing circuit and an input/output circuit. The input/output circuit is configured to input signaling or data to the processing circuit, and is further configured to output signaling or data generated by the processing circuit. The processing circuit is configured to process signaling or data, so that a communication apparatus on which the chip is installed can implement the method and the functions of the AP in any one of the foregoing embodiments.

An embodiment of this application further provides a computer program product including instructions. When the computer program product runs on a computer, the computer is enabled to perform the method and the functions of the STA in any one of the foregoing embodiments.

An embodiment of this application further provides a computer program product including instructions. When the computer program product runs on a computer, the computer is enabled to perform the method and the functions of the AP in any one of the foregoing embodiments.

An embodiment of this application further provides a wireless communication system. The system includes at least one STA and at least one AP in the foregoing embodiments.

Methods or algorithm operations described in combination with the content disclosed in the embodiments of the present invention may be implemented by hardware, or may be implemented by the processor by executing software instructions. The software instructions may include a corresponding software module, and the software module may be stored in a random access memory (RAM), a flash memory, a read-only memory (ROM), an erasable programmable read-only memory (EPROM), an electrically erasable programmable read-only memory (EEPROM), a register, a hard disk, a removable hard disk, a compact disc read-only memory (CD-ROM), or any other form of storage medium well known in the art. For example, a storage medium is coupled to a processor, so that the processor can read information from the storage medium or write information into the storage medium. Certainly, the storage medium may be a component of the processor. The processor and the storage medium may be located in an ASIC. In addition, the ASIC may be located in an AP. Certainly, the processor and the storage medium may exist in the AP as discrete components.

A person skilled in the art should be aware that in the foregoing one or more examples, functions described in the embodiments of the present invention may be implemented by hardware, software, firmware, or any combination thereof. When the functions are implemented by the software, the functions may be stored in a computer-readable medium or transmitted as one or more instructions or code in a computer-readable medium. The computer-readable medium includes a computer storage medium and a communication medium, where the communication medium includes any medium that facilitates transmission of a computer program from one place to another place. The storage medium may be any available medium accessible to a general-purpose or special-purpose computer.

The foregoing describes the embodiments of this application with reference to the accompanying drawings. However, this application is not limited to the foregoing specific implementations. The foregoing specific implementations are merely examples, but not limitations. Enlightened by this application, a person of ordinary skill in the art may derive many variants without departing from the principle of this application and the protection scope of the claims, and these variants shall fall within the protection scope of this application.

What is claimed is:

1. A method of channel sounding, comprising:
receiving, by a station (STA), channel sounding frames sent by n access points (APs), wherein n is an integer greater than 1;
performing, by the STA, channel sounding based on the channel sounding frames to obtain channel state information of each access point (AP) of the n APs;
sending, by the STA, a channel measurement report frame, wherein the channel measurement report frame comprises channel state information of m target APs in the n APs and identifiers of the m target APs, and wherein the channel measurement report frame is further to indicate that the m target APs are selected to participate in a coordinated transmission, wherein m is an integer greater than 1 and less than or equal to n, and wherein the channel measurement report frame comprises a feedback type field that indicates whether a type of feedback of channel state information by the STA is selective feedback;
responsive to the STA failing to receive, subsequent to the STA sending the channel measurement report frame, first data from a primary AP included the m target APs, sending, by the STA, a retransmission request frame to p retransmission APs in the m target APs that indicate the p retransmission APs to resend the first data, wherein p is an integer greater than or equal to 1 and less than or equal to m, the first data is shared among the m target APs, and the retransmission request frame comprises:
a retransmission AP information field comprises identification information of each retransmission AP, wherein the identification information comprises a MAC address or association identifier (AID) of each retransmission AP;
a retransmission mode field to indicate whether joint transmission is to retransmit the first data, wherein the retransmission mode field is set to a first value to indicate joint transmission and a second value to indicate non-joint transmission; and
a transmitting address indication field that indicates address information of the primary AP that is carried in the first data, wherein the address information comprises a MAC address of the primary AP;
and when the p retransmission APs are not primary APs:
receiving the first data retransmitted by a retransmission AP, wherein the first data comprises the address information of the primary AP; and
performing joint software decoding based on the first data retransmitted by the retransmission AP and the first data sent by the primary AP to obtain the first data obtained through the joint software decoding.

2. The method according to claim 1, wherein the method further comprises:
sending, by the STA, indication information, wherein the indication information is to indicate that (n–m) non-target APs are not selected to participate in the coordinated transmission.

3. The method according to claim 2, wherein the indication information comprises channel quality information of the (n-m) non-target APs and identifiers of the (n–m) non-target APs, or non-selection indication information and identifiers of the (n–m) non-target APs, wherein the channel quality information is to indicate channel quality of channels between the non-target APs and the STA, and wherein the non-selection indication information is to indicate that the (n–m) non-target APs are not selected.

4. The method according to claim 1, wherein before the sending the channel measurement report frame, the method further comprises:
sending or receiving, by the STA, a feedback type indication in the feedback type field, wherein the feedback type indication is to indicate the type of feedback of channel state information by the STA, and types of feedback of channel state information by the STA comprise the selective feedback and nonselective feedback,
wherein the selective feedback indicates that the STA feeds back channel state information of some of the n APs, and the nonselective feedback indicates that the STA feeds back the channel state information of each of the n APs.

5. The method according to claim 1, wherein the channel measurement report frame comprises a multiple-input multiple-output control field, and the feedback type field of the multiple-input multiple-output control field is a reserved value to indicate that a type of feedback of channel state information by the STA is the selective feedback.

6. A method of channel sounding, comprising:
sending, by an access point (AP), a channel sounding frame, wherein the channel sounding frame is used by a station (STA) to perform channel sounding to obtain channel state information;
receiving, by the AP, feedback information sent by the STA, wherein the feedback information comprises a feedback type field that indicates whether a type of feedback by the STA is selective feedback;
determining, by the AP based on the feedback information, whether the AP is selected by the STA to participate in coordinated transmission;
receiving, by the AP, a retransmission request frame sent by the STA after the STA fails to receive first data sent by a primary AP subsequent to the STA sending a channel measurement report frame, wherein the retransmission request frame indicates the AP to resend the first data p is an integer greater than or equal to 1 and less than or equal to m, and the retransmission request frame comprises:
a retransmission AP information field comprising identification information of each retransmission AP, wherein the identification information comprises a MAC address or association identifier (AID) of each retransmission AP;
a retransmission mode field to indicate whether joint transmission is to retransmit the first data, wherein the retransmission mode field is set to a first value to indicate joint transmission and a second value to indicate non-joint transmission; and
a transmitting address indication field that indicates address information of the primary AP that is carried in the first data, wherein the address information comprises a MAC address of the primary AP; and
sending, by the AP to the STA, the first data comprising the address information of the primary AP, wherein the STA performs joint software decoding based on the first data sent by the AP and the first data sent by the primary AP to obtain the first data obtained through the joint software decoding.

7. The method according to claim 6, wherein the feedback information is a channel measurement report frame; and wherein the determining, based on the feedback information, whether the AP is selected by the STA to participate in the coordinated transmission comprises: receiving the channel measurement report frame fed back by the STA, and identifying whether the channel measurement report frame comprises identification information of the AP and channel state information of the AP; and when the identification information and the channel state information of the AP are identified, determining that the AP is selected to participate in the coordinated transmission.

8. The method according to claim 6, wherein the feedback information is indication information; and wherein the determining, based on the feedback information, whether the AP is selected by the STA to participate in the coordinated transmission comprises: receiving, by the AP, the indication information sent by the STA, wherein the indication information is to indicate that the AP is not selected to participate in the coordinated transmission; and determining, by the AP based on the indication information, that the AP is not selected to participate in the coordinated transmission.

9. The method according to claim 8, wherein the indication information comprises channel quality information of the AP and an identifier of the AP or non-selection indication information and an identifier of the AP;
wherein the channel quality information is to indicate channel quality of a channel between the AP and the STA, and wherein the non-selection indication information is to indicate that the AP is not selected.

10. The method according to claim 7, wherein before the STA feeds back the channel measurement report frame, the method further comprises:
sending or receiving, by the AP, a feedback type indication, wherein the feedback type indication is to indicate a type of feedback of channel state information by the STA, and types of feedback of channel state information by the STA comprise the selective feedback and nonselective feedback, wherein
the selective feedback indicates that the STA feeds back channel state information of some of n APs, and the nonselective feedback indicates that the STA feeds back channel state information of each of the n APs.

11. The method according to claim 6, wherein the AP receives the first data that is sent by the primary AP.

12. A communication apparatus applied to a station (STA), comprising:
a transceiver module, configured to:
receive channel sounding frames sent by n access points (APs), wherein n is an integer greater than 1;
send a channel measurement report frame, wherein the channel measurement report frame comprises channel state information of m target APs in the n APs and identifiers of the m target APs, and wherein the channel measurement report frame is further to indicate that the m target APs are selected to participate in coordinated transmission, wherein m is an integer greater than 1 and less than or equal to n, and wherein the channel measurement report frame comprises a feedback type field that indicates whether a type of feedback of channel state information by the STA is selective feedback; and responsive to the STA failing to receive, subsequent to the sending the channel measurement report frame, first data from a primary AP included the m target APs, send, by the STA, a retransmission request frame to p retransmission APs in the m target APs that indicate the p retransmission APs to resend the first data, wherein p is an integer greater than or equal to 1 and less than or equal to m, the first data is shared among the m target APs, and the retransmission request frame comprises:

a retransmission AP information field comprising identification information of each retransmission AP, wherein the identification information comprises a MAC address or association identifier (AID) of each retransmission AP;

a retransmission mode field to indicate whether joint transmission is to retransmit the first data, wherein the retransmission mode field is set to a first value to indicate joint transmission and a second value to indicate non-joint transmission; and a transmitting address indication field that indicates address information of the primary AP that is carried in the first data, wherein the address information comprises a MAC address of the primary AP;

when the p retransmission APs are not primary APs, receive the first data retransmitted by a retransmission AP, wherein the first data comprises the address information of the primary AP; and the communication apparatus is configured to:
perform joint software decoding based on the first data retransmitted by the retransmission AP and the first data sent by the primary AP to obtain the first data obtained through the joint software decoding; and perform channel sounding based on the channel sounding frames to obtain the channel state information of each access point (AP) of the n APs.

13. The communication apparatus according to claim 12, wherein
the transceiver module is further configured to send indication information, wherein the indication information is to indicate that (n−m) non-target APs are not selected to participate in the coordinated transmission.

14. The communication apparatus according to claim 13, wherein the indication information comprises channel quality information of the (n−m) non-target APs and identifiers of the (n−m) non-target APs, or non-selection indication information and identifiers of the (n−m) non-target APs, wherein the channel quality information is to indicate channel quality of channels between the non-target APs and the STA, and where the non-selection indication information is used to indicate that the AP is not selected.

15. The communication apparatus according to claim 12, wherein the transceiver module is further configured to:
send or receive a feedback type indication, wherein the feedback type indication is to indicate a type of feedback of channel state information by the STA, and types of feedback of channel state information by the STA comprise the selective feedback and nonselective feedback, wherein
the selective feedback indicates that the STA feeds back channel state information of some of the n APs, and the nonselective feedback indicates that the STA feeds back the channel state information of each of the n APs.

16. The communication apparatus according to claim 12, wherein the channel measurement report frame comprises a multiple-input multiple-output control field, and the feedback type field of the multiple-input multiple-output control field is a reserved value to indicate that a type of feedback of channel state information by the STA is selective.

* * * * *